(12) United States Patent
Weinberg et al.

(10) Patent No.: US 8,111,241 B2
(45) Date of Patent: Feb. 7, 2012

(54) GESTURAL GENERATION, SEQUENCING AND RECORDING OF MUSIC ON MOBILE DEVICES

(75) Inventors: Gil Weinberg, Atlanta, GA (US); Benedikt Loesch, Stuttgart (DE); Andrew Beck, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 824 days.

(21) Appl. No.: 12/178,499

(22) Filed: Jul. 23, 2008

(65) Prior Publication Data
US 2009/0027338 A1  Jan. 29, 2009

Related U.S. Application Data

(60) Provisional application No. 60/951,558, filed on Jul. 24, 2007, provisional application No. 60/982,205, filed on Oct. 24, 2007, provisional application No. 61/013,360, filed on Dec. 13, 2007, provisional application No. 61/021,181, filed on Jan. 15, 2008, provisional application No. 61/036,300, filed on Mar. 13, 2008.

(51) Int. Cl.
*G09G 5/08* (2006.01)
(52) U.S. Cl. ........ 345/158; 345/159; 345/160; 345/165; 345/163; 345/167
(58) Field of Classification Search .......... 345/156–179, 345/1.1; 178/19.01–19.05, 18.05; 463/37, 463/30, 39, 16; 715/702
See application file for complete search history.

(56) References Cited

U.S. PATENT DOCUMENTS

| | | | |
|---|---|---|---|
| 6,998,966 B2 | 2/2006 | Pedersen et al. | |
| 7,042,440 B2* | 5/2006 | Pryor et al. | 345/158 |
| 7,336,266 B2* | 2/2008 | Hayward et al. | 345/179 |
| 2004/0125044 A1* | 7/2004 | Suzuki | 345/1.1 |
| 2004/0169674 A1 | 9/2004 | Linjama | |
| 2006/0017692 A1 | 1/2006 | Wehrenberg et al. | |
| 2006/0097983 A1 | 5/2006 | Haggman et al. | |
| 2006/0279542 A1 | 12/2006 | Flack et al. | |
| 2007/0002017 A1 | 1/2007 | Mezhibovsky | |
| 2007/0070038 A1* | 3/2007 | Hoffberg et al. | 345/156 |
| 2007/0132714 A1 | 6/2007 | Nilsson | |
| 2007/0137462 A1* | 6/2007 | Barros et al. | 84/453 |
| 2007/0176898 A1 | 8/2007 | Suh | |
| 2007/0200821 A1 | 8/2007 | Conradt et al. | |
| 2008/0076506 A1* | 3/2008 | Nguyen et al. | 463/16 |

(Continued)

OTHER PUBLICATIONS

Tindale, et al.; A Comparison of Sensor Strategies for Capturing Percussive Gestures; NIME05, Vancouver, BC, Canada; Copyright 2005; pp. 200-203.

(Continued)

*Primary Examiner* — Prabodh M Dharia
(74) *Attorney, Agent, or Firm* — Thomas, Kayden, Horstemeyer & Risley, LLP

(57) ABSTRACT

System and methods for an application that allows users to interactively create, transform and play music using cell phones, iPhones™ and other enabled mobile communication devices communicating with a remote host are disclosed. Using an enabled mobile communication device, users are able to strike the mobile device like a drum to create and record rhythms, enter melodies using the keypads, add voice recordings, and manipulate musical tracks by tilting the mobile device continuously in three dimensions. The musical input is sequenced in multiple tracks and the transformative manipulations are applied in real time, allowing users to create their songs in an expressive motion-based manner.

17 Claims, 34 Drawing Sheets

U.S. PATENT DOCUMENTS

| | | | |
|---|---|---|---|
| 2008/0122786 A1* | 5/2008 | Pryor et al. | 345/156 |
| 2008/0174550 A1* | 7/2008 | Laurila et al. | 345/158 |
| 2008/0211766 A1* | 9/2008 | Westerman et al. | 345/156 |
| 2008/0300055 A1* | 12/2008 | Lutnick et al. | 463/39 |
| 2009/0143141 A1* | 6/2009 | Wells et al. | 463/37 |
| 2011/0034244 A1* | 2/2011 | Marks et al. | 463/30 |

OTHER PUBLICATIONS

Steiner, et al.; A Unified Toolkit for Accessing Human Interface Devices in Pure Data and Max/MSP; NIME07, New York, NY, USA; Copyright 2007; pp. 375378.

Nam, et al.; Addressing the Same but different—different but similar problem automatic music classification; Proc. Multimedia Information Retrieval, 2001; 2 pages.

Young, et al.; AoBachi: A New Interface for Japanese Drumming; NIME04, 2004; 4 pages.

Flety, Emmanuel; AtoMIC Pro: A Multiple Sensor Acquisition Device; Proceedings of the 2002 conference in New interfaces for musical expression, Dublin, Ireland; 2002; 6 pages.

Rohs, et al.; CaMus2—Collaborative Music Performance with Mobile Camera Phones; ACE '07, Salzburg, Austria; Copyright 2007; 6 pages.

Rohs, et al.; CaMus2—Optical Flow and Collaboration in Camera Phone Music Performance; NIME07, New York, NY, USA; Copyright 2007; 4 pages.

Rath, et al.; Explorations in Sound for Tilting-Based Interfaces; ICMI '06, Banff, Alberta, Canada; Copyright 2006; pp. 295-301.

Tanaka, et al.; Facilitating Collective Musical Creativity; MM '05, Singapore; Copyright 2005; pp. 191-198.

Pirhonen, et al.; Gestural and Audio Metaphors as a Means of Control for Mobile Devices; CHI 2002, Minneapolis, Minnesota, USA, vol. 4, Issue No. 1; Copyright 2002; pp. 291-298.

Paine, Dr. Garth; Gesture and Musical interaction: Interactive Engagement Through Dynamic Morphology; NIME04, International Conference on New Interfaces for Musical Expression, 2004; 7 pages.

Wessel, et al.; Intimate Musical Control of Computers with a Variety of Controllers and Gesture Mapping Metaphors; NIME-02, Dublin, Ireland; 2002; 3 pages.

Bottoni, et al.; Mapping with Planning Agents in Max/MSP Environment: the GO/Max Language; NIME06, Paris France; 2006; pp. 322-325.

Tanaka, Atau; Mobile Music Making; Proceedings of the 2004 conference on New interfaces for musical expression, Hamamats7u, Shizuoka, Japan; 2004; 3 pages.

Gaye, et al.; Mobile Music Technology: Report on an Emerging Community; NIME '06, Paris France; 2006; 4 pages.

Aimi, Roberto; Percussion Instruments Using Realtime Convolution: Physical Controllers; NIME07, New York, NY, USA; Copyright 2007; pp. 154-159.

Wessel, et al.; Problems and Prospects for Intimate Musical Control of Computers; Proceedings of the New Instruments for Musical Expression Workshop. CHI, Seattle; 2001; 4 pages.

Hinckley, et al.; Sensing Techniques for Mobile Interaction; ACM UIST 2000, Symposium on User Interface Software and Technology, CHI Letters 2(2), pp. 91-100 (10 pages).

Essl, et al.; Shamus—A Sensor-Based Integrated Mobile Phone Instrument; in Proceedings of the Intl. Computer Music Conference (ICMC), Copenhagen; 2007; 4 pages.

Williamson, et al.; Shoogle: Excitatory Multimodal Interaction of Mobile Devices; CHI 2007 Proceedings, San Jose, CA, USA; Copyright 2007; pp. 121-124.

Allison, et al.; Teabox: A Sensor Data Interface System; NIME05, Vancouver, BC, Canada; 2005; pp. 56-59.

* cited by examiner

MESSAGE TYPE CODES
WITH ASSOCIATED EXTRA INFORMATION IN THE
PACKET

| 610 TYPERESET (0) |
|---|
| 1: CLEAR ALL TRACKS
0: DEFAULT |

| 620 TYPESENSOR (1) |
|---|
| RAW X VALUE
RAW Y VALUE
RAW Z VALUE
PITCH IN DEGREES
ROLL IN DEGREES |

| 630 TYPENOTE (2) |
|---|
| NOTE NUMBER
1: NOTE ON,
0: NOTE OFF |

| 640 TYPEWAV (3) |
|---|
| NUMBER OF BYTES TO EXPECT |

| 650 TYPECLEAR (4) |
|---|
| 1: CLEAR CURRENT TRACK
0: DEFAULT |

| 660 TYPECHANGE (5) |
|---|
| NEW TRACK NUMBER |

| 670 TYPETEMPO (6) |
|---|
| 1: FASTER TEMPO,
0: SLOWER TEMPO |

| 680 TYPEREC (7) |
|---|
| 1: RECORDING STARTED,
0: RECORDING STOPPED |

FIG. 6

| | |
|---|---|
| CBT - SYMBIAN ACTIVE OBJECT THAT OPENS A BLUETOOTH SOCKET TO SEND DATA THROUGH 2600 | |
| 2610 CLASSES OWNED BY CBT | CBTSERVICEADVERTISER (IADVERTISER) |

| |
|---|
| 2620                             CBT::STARTL<br>INITALIZES ACTIVE OBJECT, ADDS TO ACTIVE OBJECT QUEUE, OPENS A BLANK SOCKET, FINDS A FREE CHANNEL TO USE, STARTS ADVERTISING BY CALLING IADVERTISER->STARTADVERTISINGL(CHANNEL) AND IADVERTISER->UPDATEAVAILABILITY(ETRUE), AND THEN WAITS TO ACCEPT A SOCKET, AFTER WHICH RUNL IS CALLED |
| 2630                             CBT::RUNL<br>RUN FUNCTION FOR THE ACTIVE OBJECT, DETERMINES IF THERE ARE ANY ERRORS IN BLUETOOTH BY CHECKING ISTATUS, AND THEN CALLS THE NEXT APPROPRIATE METHOD.<br>DURING THE CONNECTING STAGE, THIS IS CALLED AFTER A SOCKET HAS BEEN ACCEPTED, IN WHICH CASE CBT CALLS IADVERTISER->UPDATEAVAILABILITY(EFALSE) TO STOP ADVERTISING.<br>IN ALL OTHER CASES, IT JUST SENDS IT TO WAIT FOR NEW INCOMING DATA (WHICH WILL NEVER HAPPEN IN OUR PROTOCOL). |
| 2640                           CBT::SENDMESSAGEL<br>SENDS A BUFFER TO THE ACTIVE SOCKET, IF CONNECTED |
| 2650                           CBT::SENDDATAL<br>SENDS RAW BYTE DATA TO ACTIVE SOCKET, IF CONNECTED |
| 2660                           CBT::SETSECURITYWITHCHANNELL<br>FINDS A FREE CHANNEL AND SETS THE SECURITY TO BE PUBLICLY VIEWABLE, AND SAYS IT DOES NOT REQUIRE AUTHORIZATION FROM THE USER WHEN SOMEONE TRIES TO CONNECT |
| 2660                           CBT::SENDFILEL<br>SPLITS THE FILE INTO SMALLER PACKETS TO SEND VIA BLUETOOTH. EACH TIME A CHUNK IS COMPLETED SENDING, RUNL WILL CALL THIS METHOD AGAIN |
| IMPORTANT VARIABLES<br>TSTATE ISTATE - STATE OF ACTIVE OBJECT (SENDING, CONNECTING, ETC); ISTATUS - VARIABLE REPRESENTING ERROR STATES THAT IS SENT TO ASYNCHRONOUS MESSAGES; RSOCKETSERV ISOCKETSERVER - SOCKET SERVER THAT CBT REQUESTS OPEN SOCKETS FROM; RSOCKET* ISOCKET, IACCEPTEDSOCKET - SOCKETS USED DURING CONNECTION PROCESS RSOCKET* IACTIVESOCKET - FINAL SOCKET REPRESENTING A CONNECTION TO THE COMPUTER |

FIG. 26

2700 CBTSERVICEADVERTISER
CREATES A SERVICE RECORD FOR THE BLUETOOTH RFCOMM PROTOCOL AND ADVERTISES IT

2710 CBTSERVICEADVERTISER::STARTADVERTISINGL
CREATES A SERVICE RECORD IN THE SDP (SERVICE DISCOVERY PROTOCOL) DATABASE, THEN ADDS DESCRIPTORS FROM BUILDPROTOCOLDESCRIPTIONL TO THE RECORD

2720 CBTSERVICEADVERTISER::BUILDPROTOCOLDESCRIPTIONL
CREATES AN CSDPATTRVALUESDES* (SDP ATTRIBUTE VALUES) LIST THAT DESCRIBES THE RFCOMM PROTOCOL ON THE SPECIFIED CHANNEL, ON TOP OF THE L2CAP PROTOCOL (RFCOMM USES L2CAP, SPECIFIED IN THE BLUETOOTH DOCUMENTS)

2730 CBTSERVICEADVERTISER::UPDATEAVAILABILITY
UPDATES THE RECORD CREATED IN STARTADVERTISINGL TO BE AVAILABLE

IMPORTANT VARIABLES
TSDPSERVRECORDHANDLE IRECORD - HANDLE TO THE SERVICE CREATED IN STARTADVERTISINGL
RSDPDATABASE ISDPDATABASE - REFERENCE TO THE SDP DATABASE

FIG. 27

GESTURAL GENERATION, SEQUENCING AND RECORDING OF MUSIC ON MOBILE DEVICES

CROSS REFERENCE TO RELATED APPLICATIONS

This application claims the benefit of U.S. Provisional Application No. 60/951,558 filed Jul. 24, 2007, U.S. Provisional Application No. 60/982,205 filed Oct. 24, 2007, U.S. Provisional Application No. 61/013,360 filed Dec. 13, 2007, U.S. Provisional Application No. 61/021,181, filed Jan. 15, 2008, U.S. Provisional Application No. 61/036,300, filed Mar. 13, 2008.

U.S. Provisional Application No 60/982,205 is incorporated in its entirety herein by reference, U.S. Provisional Application No. 60/951,558 is incorporated in its entirety herein by reference, U.S. Provisional Application No. 61/013,360 is incorporated in its entirety herein by reference, U.S. Provisional Application No. 61/021,181 is incorporated in its entirety herein by reference, U.S. Provisional Application No. 61/036,300 is incorporated in its entirety herein by reference, and U.S. patent application entitled: Detecting User Gestures with a Personal Mobile Communication Device, U.S. patent application Ser. No. 12/178,496 with inventors Gil Weinberg, and Jagadeeswaran Jayaprakas, filed Jul. 23, 2008 is incorporated in its entirety herein by reference.

TECHNICAL FIELD

The present disclosure is generally related to electronic music composition and more particularly, is related to sensor-based electronic music composition and transformation through interactive gestural control of a personal mobile communication device.

BACKGROUND

Within the last two decades, cellular phones have become incorporated into almost every aspect of daily life. Cellular phones are truly ubiquitous devices which have achieved their usefulness and relatively low cost from continuing advances in modern microelectronics. As microelectronic memory densities and processing power have increased year after year, cellular phones have benefited from the commensurate availability of increasing computing power. Coupled with advances in radio frequency (RF) integrated circuits, power management microelectronics, and battery charge density improvements, the size of a typical cellular phone has been reduced to a package which fits easily in the palm of a hand.

The computational power now available in modern 3G (third generation) cellular phones rivals that of wireless personal digital assistants, so much so that there is presently almost no distinction between cellular phones, wireless communication devices targeted for email (e.g., BlackBerry™), and wireless personal digital assistants (wPDAs) (e.g. Treo™, PalmPilot™, etc.). Any device which provides bi-directional audio communication over a cellular radio network and possesses sufficient local processing capability to control the device and execute stored user applications (e.g., texting, email, calculator, web browser, games) is often referred to as a "smart phone." The term "personal mobile communication devices" (PMCDs) more broadly comprises a class of devices which includes, but is not limited to, "smart phones," wireless PDAs, and cellular phones, as well as other devices for communicating or processing speech which possess various degrees and combinations of embedded processing power and network connectivity (e.g., Apple™ iPhone™).

PMCDs often contain sensors and transducers by which a user interacts with the device, some of which are used for gestural interaction. An example of a transducer included in several higher-end PMCDs is the accelerometer. An accelerometer senses accelerations of the PMCD resulting from changes in kinetic forces acting upon the device as well as changes relative to the gravitational force. For instance, an accelerometer may be used to detect user gestures including physical shakes of the device, strikes of the PMCD against an eternal body, or, conversely, the strike of an external body against the PMCD. The latter events may be described as a "tap" or "hit" of the device. These user gestures can then be captured, recognized, and mapped to a specific user interface function. An accelerometer may also be used to detect if the device has been dropped or if the device's orientation with respect to gravity has changed (e.g., if the device has been tilted) or even to detect if the device has been picked up (e.g., in preparation for answering a call).

The abundant processing power, availability of user interface features, and native facilities for connecting with wireless networks, provides opportunities, therefore, to develop many new and useful applications. One such field of applications is that of music composition and performance in which PMCDs may be used to compose, transform, and play music.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications and equivalents.

FIG. 6 is a listing of the message types and parameters of the BlueTaps Data Exchange Protocol.

FIG. 26 is a block diagram of the member functions and attributes of an object oriented class for implementing BlueTaps.

FIG. 27 is a block diagram of the member functions and attributes of an object oriented class for implementing BlueTaps.

DETAILED DESCRIPTION OF THE PREFERRED EMBODIMENTS

Various embodiments of a system and methods for gesturally and interactively creating music with personal mobile communication devices (PMCDs) coupled to an external remote host, are disclosed. In one embodiment of the present disclosure, a PMCD operates as an interactive musical instrument possessing interactive, gestural, motion-based interfaces, which wirelessly communicates music composition data for music creation to the remote host. In another embodiment, more than one PMCD simultaneously wirelessly communicate music composition data to the remote host.

Gestural interaction with a PMCD allows for a motion-based, interactive interface which quite naturally aligns with the creative music composing process. By utilizing sensors available in PMCDS, user gestures may be detected which facilitate new techniques for composing music through expressive motion-based interaction and control. For instance, in one embodiment a music application executing on a PMCD may allow a user to generate sounds of various percussion instruments in response to shakes and strikes of the PMCD. Responsiveness of a PMCD to the expressive actions of a virtual drummer who uses the PMCD as a drumstick provides a more realistic environment for capturing the musical intent of the performer while also allowing one or more performers to communicate bodily and to synchronize their actions.

Other gestural interactions include pressing keys of a keypad or keyboard and a touching a touch screen.

Figure 1:
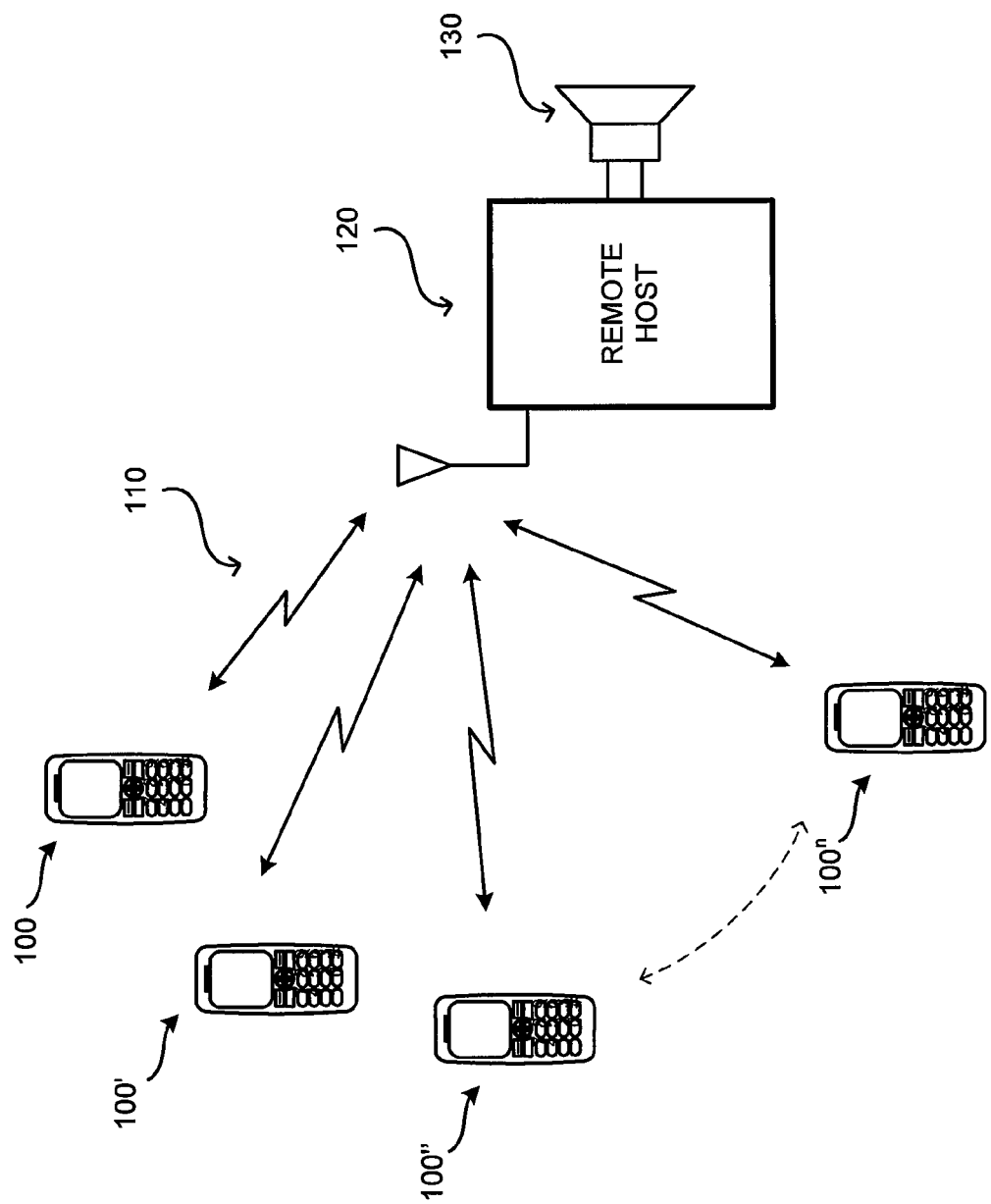
FIG. 1 is a system for wirelessly communicating between one or more personal mobile communication devices and a remote host, in one embodiment of the systems and methods disclosed herein.

FIG. 1 illustrates an interactive system for creating and transforming music. The system comprises one or more PMCDs 100 and a remote host 120 communicating through wireless network 110. In response to user gestures and recordings captured by PMCD 100, music composition data messages are generated by each PMCD 100 and communicated to external remote host 120 through wireless link(s) 110. Responsive to receiving and decoding the music composition data messages communicated by PMCD 100, remote host 120 synthesizes, and plays back music through speaker(s) 130.

Figure 2:
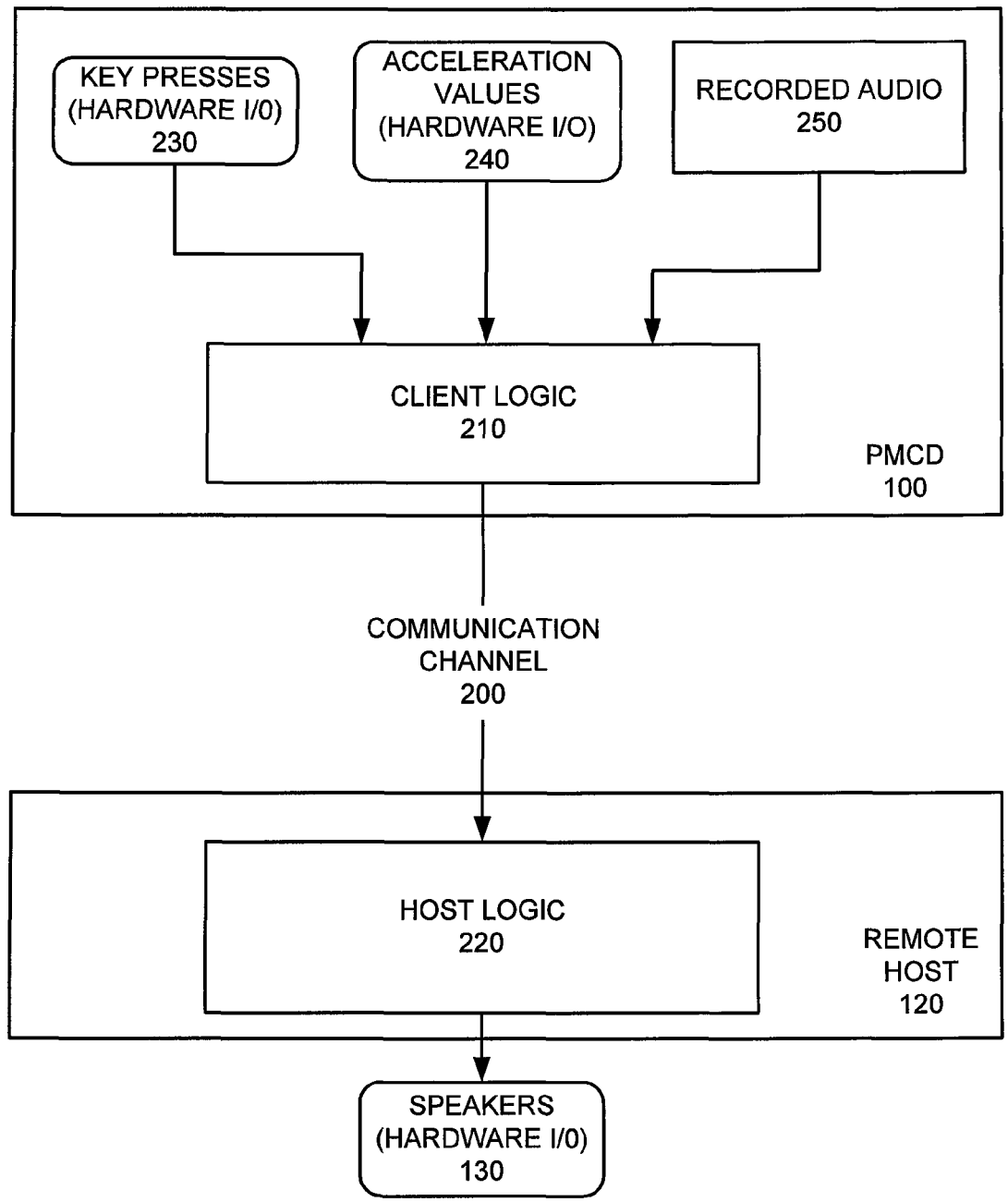
FIG. 2 is a block diagram illustrating a personal mobile communication device receiving input from sensors and communicating with a remote host through a communication channel, in one embodiment of the systems and methods disclosed herein.

FIG. 2 is a block diagram of a single PMCD 100 communicating with remote host 120 through communication channel 200. In one embodiment PMCD 100 contains client logic 210 configured to display a user interface to the user and receive from the user music composition data messages for the creation of music on remote host 120. Music composition events which may cause PMCD 100 to generate messages include user gestures such as movements of PMCD 100, causing accelerometer 240 to register movement, key presses of a keypad or menu button 230, and recordings of an audio or image file 250.

Client logic 210 further includes logic for translating music composition data into music composition data messages and for communicating the messages to remote host 120 through communication channel 200.

In one embodiment, events generating music composition data include, for example, drum strikes, note selections, instrument selection, and track assignments, transformative effects (e.g., changes in volume, tempo, vibrato, and tremolo), and musical source data such as audio recordings. In some embodiments, individual keys of keypad 230 are used for entering melodic lines. Music composition data messages are sent for both keydown and keyup events so that a user can control the lengths of the notes. In the event of a keydown or keyup event, the associated music composition data message includes a key identifier which identifies the particular key pressed by the user.

Communication channel 200 may implements a wireless networking protocol such as Bluetooth or IEEE 802.11 (Wi-Fi) in one embodiment. In other embodiments, communication channel 200 may implement a networking protocol across a wired connection, an infrared connection, a cellular radio connection, or any communication medium enabling communication between two or more devices.

Remote host 120 is configured with host logic 220 to receive music composition data messages from PMCD 100 over communication channel 200 and further configured to process the messages to recover data and commands for generating sound which is played through speaker(s) 130. Processes for processing messages, recording, and transforming music composition data will be discussed in connection with FIG. 3.

Although FIG. 2 illustrates a single PMCD 100 communicating with remote host 120, this figure is not intended to be limiting and additional embodiments of the present disclosure may include additional PMCDs 100 which may be in communication with remote host 120 at any one time.

Within remote host 120, messages comprising music composition and transformative effect data is received from the one or more PMCDs 100 and recorded onto multiple tracks where it is then continuously read back, synthesized, transformed and played through speaker(s) 130. Remote host 120 continuously loops all of the tracks during playback such that when it reaches the end of each track, it immediately returns to the beginning and continues. Additional transformations and manipulations of the recorded music are applied by remote host 120 as directed in recorded effects tracks or remote host 120 may apply such effects as they are received in real-time from PMCD 100.

Figure 3:
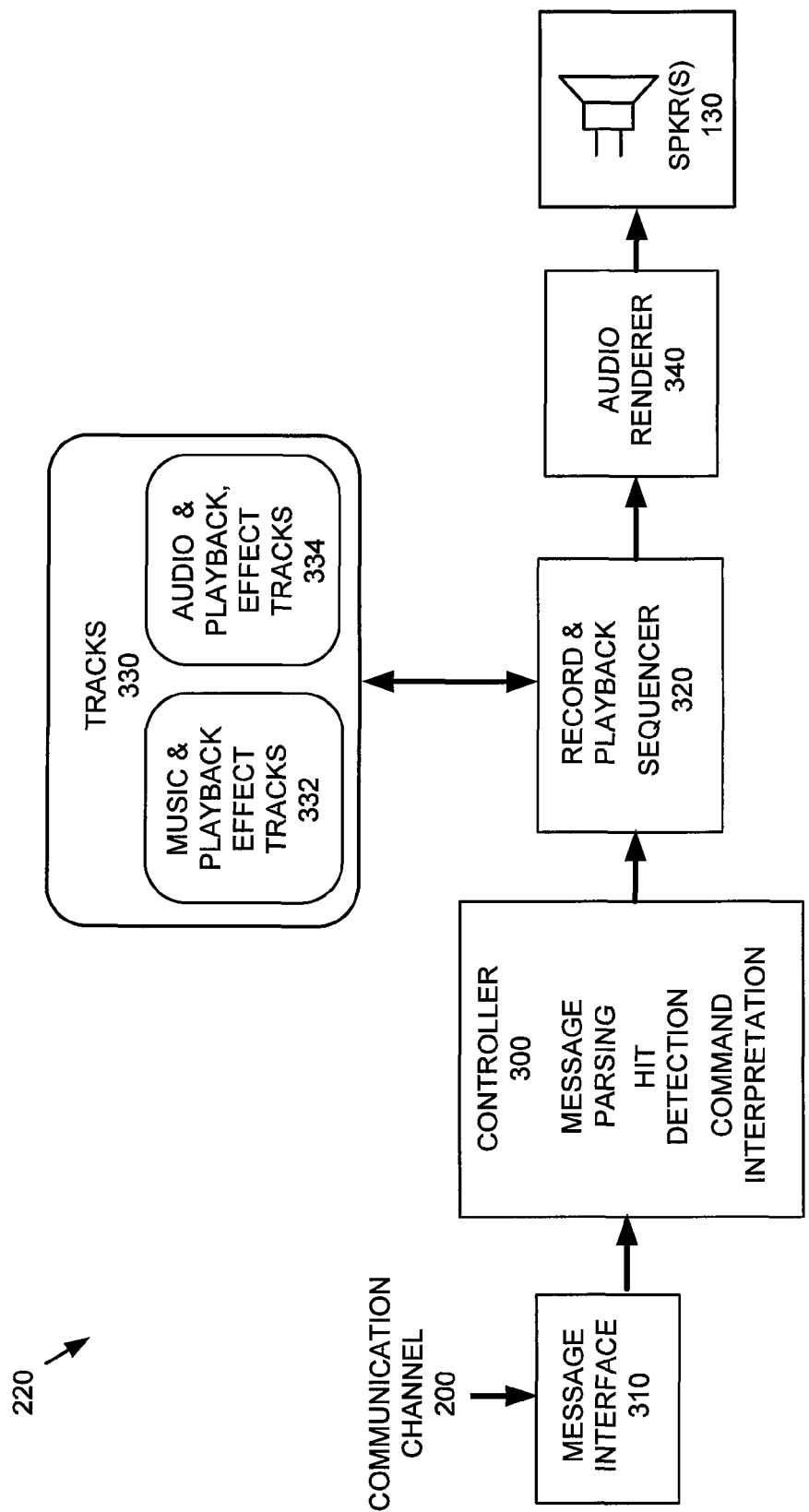
FIG. 3 is an illustration of a system for implementing BlueTaps between a host computer and one or more Personal Mobile Communication Device over a wireless connection, in one embodiment of the systems and methods disclosed herein.

FIG. 3 provides further detail of host logic 220 discussed in relation to FIG. 2. Music composition data messages are received from one or more PMCDs 100 over the communication channel 200 and sent to message interface 310. Message interface 310 recovers the messages transmitted by PMCD 100 and provides the recovered messages to controller 300. Controller 300 then parses each message provided by message interface 310 to extract compositional data, commands, and audio files.

Commands, music compositional data, and audio files parsed by controller 300 are sent to Record and Playback Sequencer 320. Record and Playback sequencer 320 records events, manages tracks, applies effects, and simultaneously records and plays back the several tracks of recorded data in order to provide data to the music synthesizer which generates the music. Music is composed by recording event data (e.g., for sounding notes, effect data, or actual audio) to a plurality of individual tracks 330 as will be described later. Music data and corresponding effects are written to tracks 332 while audio and effect data is written tracks 334 respectively. All tracks are of equal length and begin and end playback simultaneously. Each block 332 and 334 may be comprised of multiple tracks as will be discussed later. At the point during playback at which the end of the tracks is reached, sequencer 320 loops back to the beginning and recommences playback. In response to new data provided by phone controller 300, Record and Playback sequencer 320 records new music compositional data to music tracks 332 respectively, while new audio data is recorded to a plurality of audio tracks 334 respectively. Other transformative commands intended to affect the overall character of the entire composition are applied in real-time to the composite data that is continually generated by playback sequencer 320 from recorded data.

As described above, once started, Record and Playback Sequencer 320 continually reads back data recorded on the plurality of music and audio tracks, 332 and 334, and applies transformative effects to each track from the respective playback effect track. Music, audio, and effect data is read from each track in such a manner that the data and events read back from all tracks are temporally synchronous and, when combined, generate a temporally synchronized composite data stream. Prior to providing the temporally synchronized composite data stream to audio renderer 340 for audio generation, real-time global effects are applied to the composite stream which results in a final transformed composite data stream. Record and Playback sequencer 320 then provides this composite data stream to audio renderer 340. Audio renderer 340 receives the composite data stream from sequencer 320 and generates the corresponding audio. The generated audio is then played through speaker(s) 130.

Record and Playback Sequencer 320 maintains a plurality of recording tracks for the recording of compositional instructions, audio and data communicated from PMCDs 100 so that the complete musical composition may be continually reconstructed and the audio rendered by the external remote host. As will be discussed below, music tracks 332 and audio tracks 334 are each comprised of multiple synchronized percussion, melody and audio tracks with corresponding effect tracks, such that each individual instrument and audio component is recorded to its own individual track while transformative effects are recorded to additional individual effects tracks associated with each instrumental and audio track. Furthermore, a global effects track records global effects which are applied to the final composited data stream prior to audio rendering.

In one embodiment of the present disclosure, audio is analyzed by controller 300 to identify user gestures including "hits," "taps," and "sweeps." If a user gesture is identified through audio analysis, the gesture is then mapped by controller 300 to a corresponding musical, command, or transformation event. Analysis of audio to detect user gestures is disclosed in U.S. patent application Ser. No. 12/178,496, titled "Detecting User Gestures with a Personal Mobile Communication Device."

Figure 4:
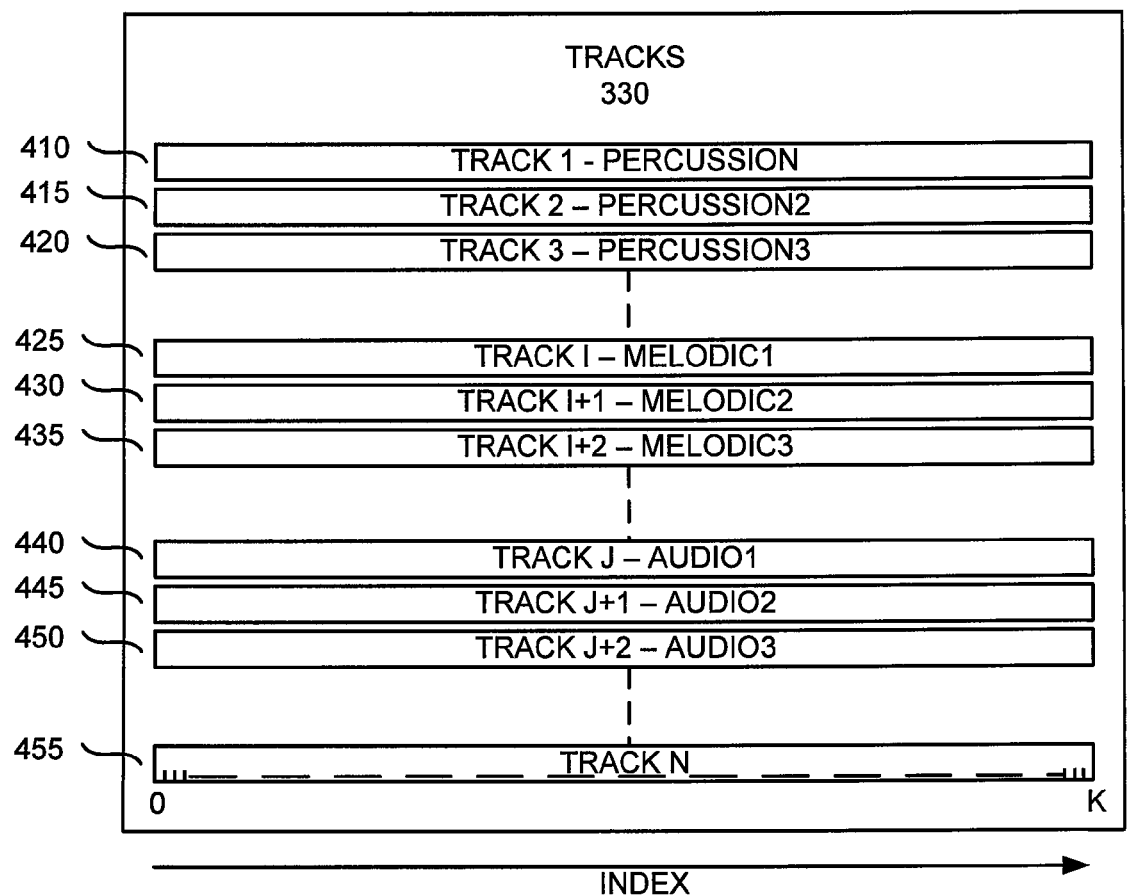
FIG. 4 is an illustration of multiple recording tracks for recording music event data on a remote host.

FIG. 4 illustrates a plurality of recording tracks, 410 to 455, for recording music data, effect data, and audio data. In the present embodiment, each track is assigned to a single instrument or audio recording. For instance, in one embodiment tracks 1 to 3 are assigned to percussion instruments, tracks 4 to 6 are assigned to melodic instruments, and tracks 7 to 9 are assigned audio recordings. Other embodiments may use additional or fewer tracks for each instrument or audio family. Audio sequences may contain voice recordings made with the PMCD 100, recordings communicated from other PMCDs to the host or to PMCD 100, as well as recordings of phone calls received by PMCD 100. Other various embodiments may assign additional or fewer tracks to the different families of instruments or sound sources and audio tracks may contain additional non-voice recordings from other sources.

Music composition data messages are generated by PMCD 100 in response to user actions and communicate compositional actions to be performed by the remote host, data to be recorded to particular tracks, or files to be exchanged. The Bluetaps Data Exchange Protocol, shown in FIG. 5, FIG. 6 and FIG. 7, forms the application layer protocol for formatting music composition data messages for transmission from PMCD 100 to remote host 120. As an application layer protocol, Bluetaps may be used regardless of the network and transport layer protocols employed.

Figure 5:
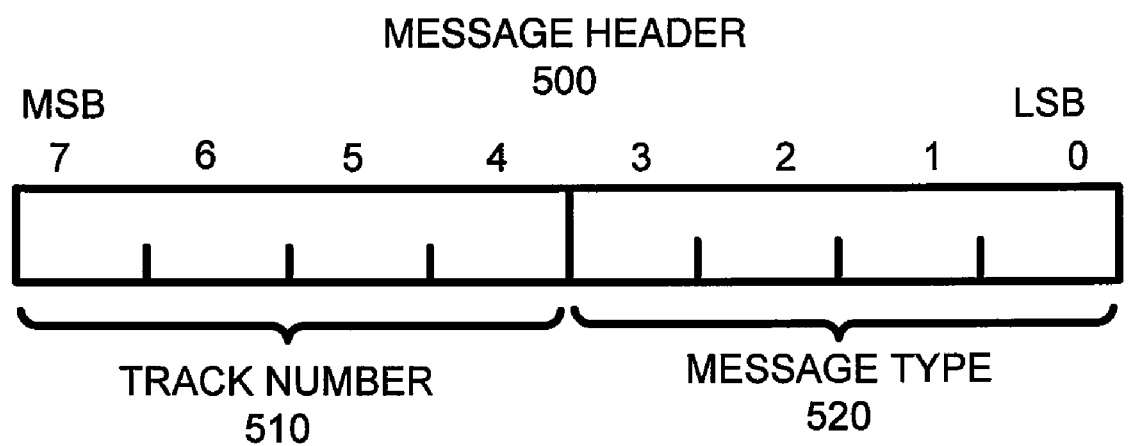
FIG. 5 is a block diagram of the BlueTaps Data Exchange Protocol header.

The Bluetaps protocol is comprised of a message header followed by optional data fields. The message header is further comprised of additional fields. FIG. 5 illustrates one embodiment wherein message header 500 is comprised of two four-bit fields: a four-bit track number field 510 placed in bits seven down to four, and a four-bit message type field 520 placed in bits three down to zero. Various other embodiments may extend the size of these protocol fields to support additional tracks and message types or add additional fields (e.g., for determining which PMCD sent the message). Within each message header, track number field 510 contains the number of the recording track to which the transmitted message applies. Global messages applying to all tracks including control messages and global effects messages do not utilize track number field 510 or, in another embodiment, may default to zero.

FIG. 6 illustrates one embodiment of eight Bluetaps Data Exchange Protocol message types. Upon generation of a message, the numerical identifier associated with the type of message being sent is placed in the message type field, 520, of message header 500. Additional parameters corresponding to the message type are listed with each message type and are carried in an additional parameter field following the message header. Once fully formed, the message is sent by the client logic 210 to the communication channel 200 for delivery to remote host 120. Additional embodiments of the message type field may allow additional message types to be defined.

Figure 7:
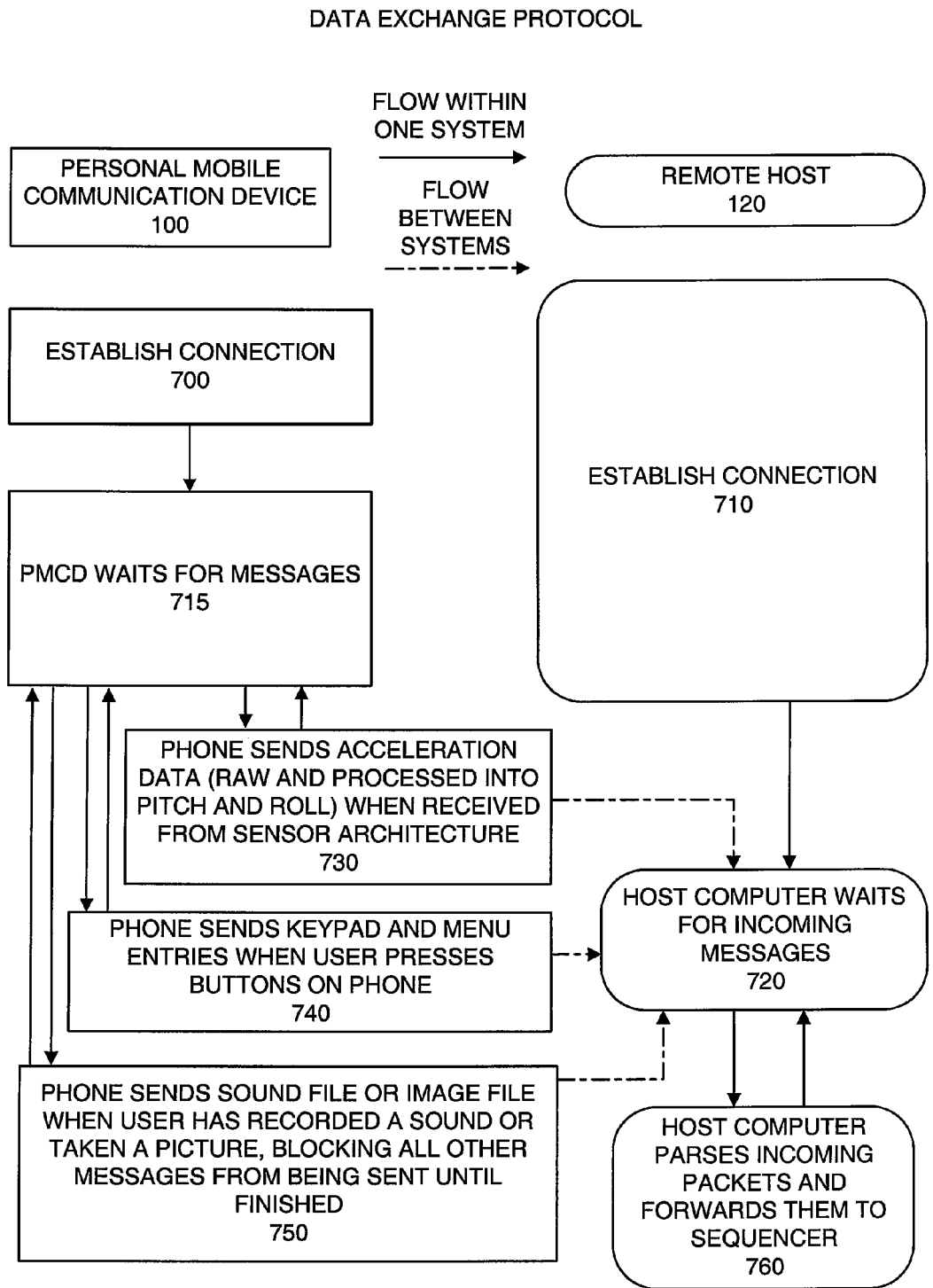
FIG. 7 is a block diagram illustrating BlueTaps Data Exchange Protocol data flows, in one embodiment of the systems and methods disclosed herein.

FIG. 7 illustrates one embodiment of the Bluetaps protocol state machine for implementing data exchange between PMCD 100 and remote host 120. Control is partitioned between PMCD 100 and remote host 120 and data is exchanged responsive to user gestures and actions made with PMCD 100. At 700 and 710, PMCD 100 and remote host 120 jointly establish a socket for network communications through the use of standard networking protocols. At 715 PMCD 100 waits for a message event to occur. Remote host 120 enters message servicing loop 720 and waits to receive messages from PMCD 100 over communication channel 200. Remote host 120 receives message through its data connection 310 and notifies phone controller 300 of a received message. Once a message is received, remote host 120 leaves 720 and begins parsing the packet at 760. Once the packet is parsed, it is sent to sequencer 320 and remote host 120 returns to 720 to wait for the arrival of the next packet. Each message passed from PMCD 100 to remote host 120 is of the form described previously in discussions of FIGS. 5 and 6.

Figure 8A:
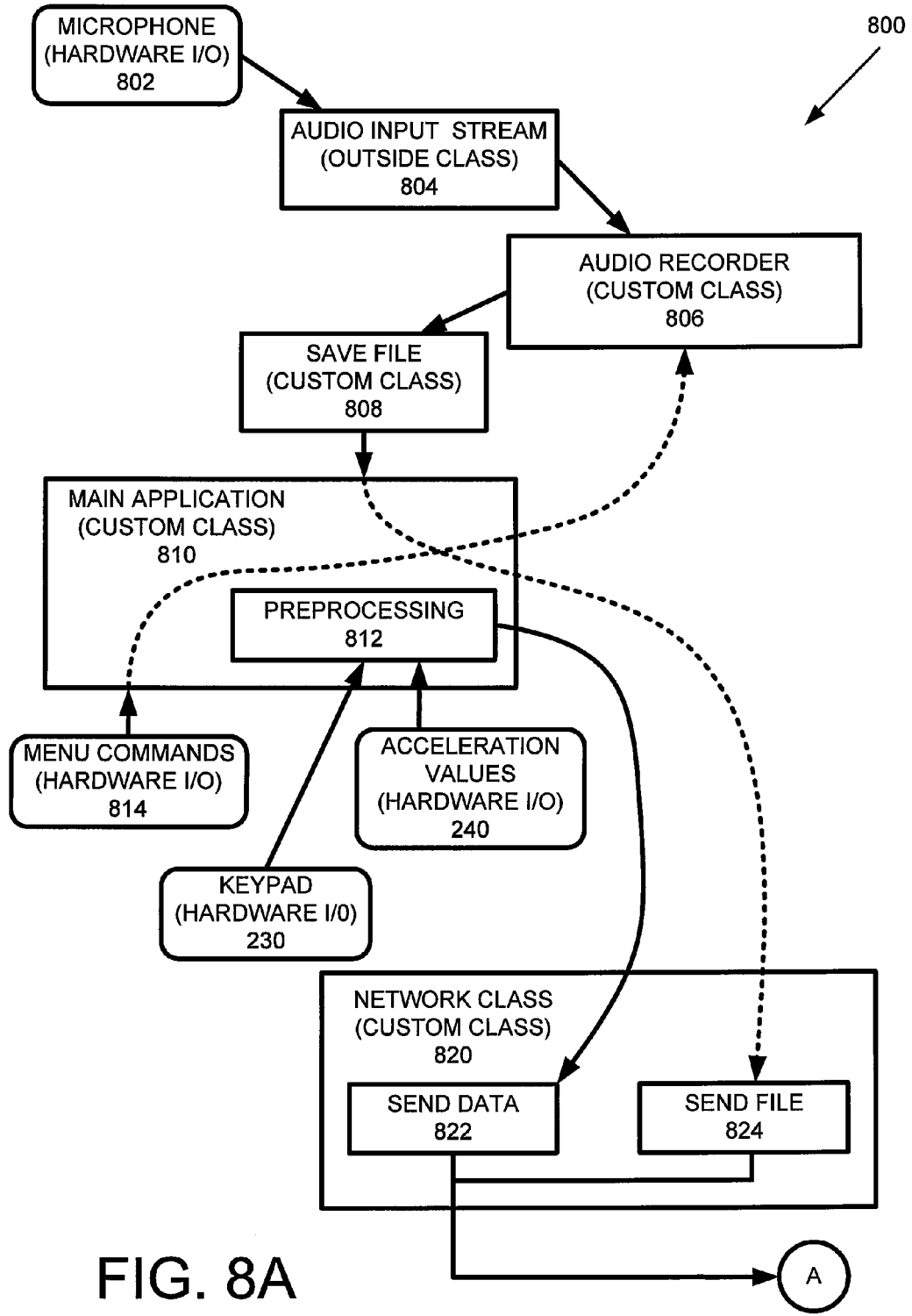
FIG. 8A is a diagram of object classes and their interactions executing on a personal mobile communication device.
Figure 8B:
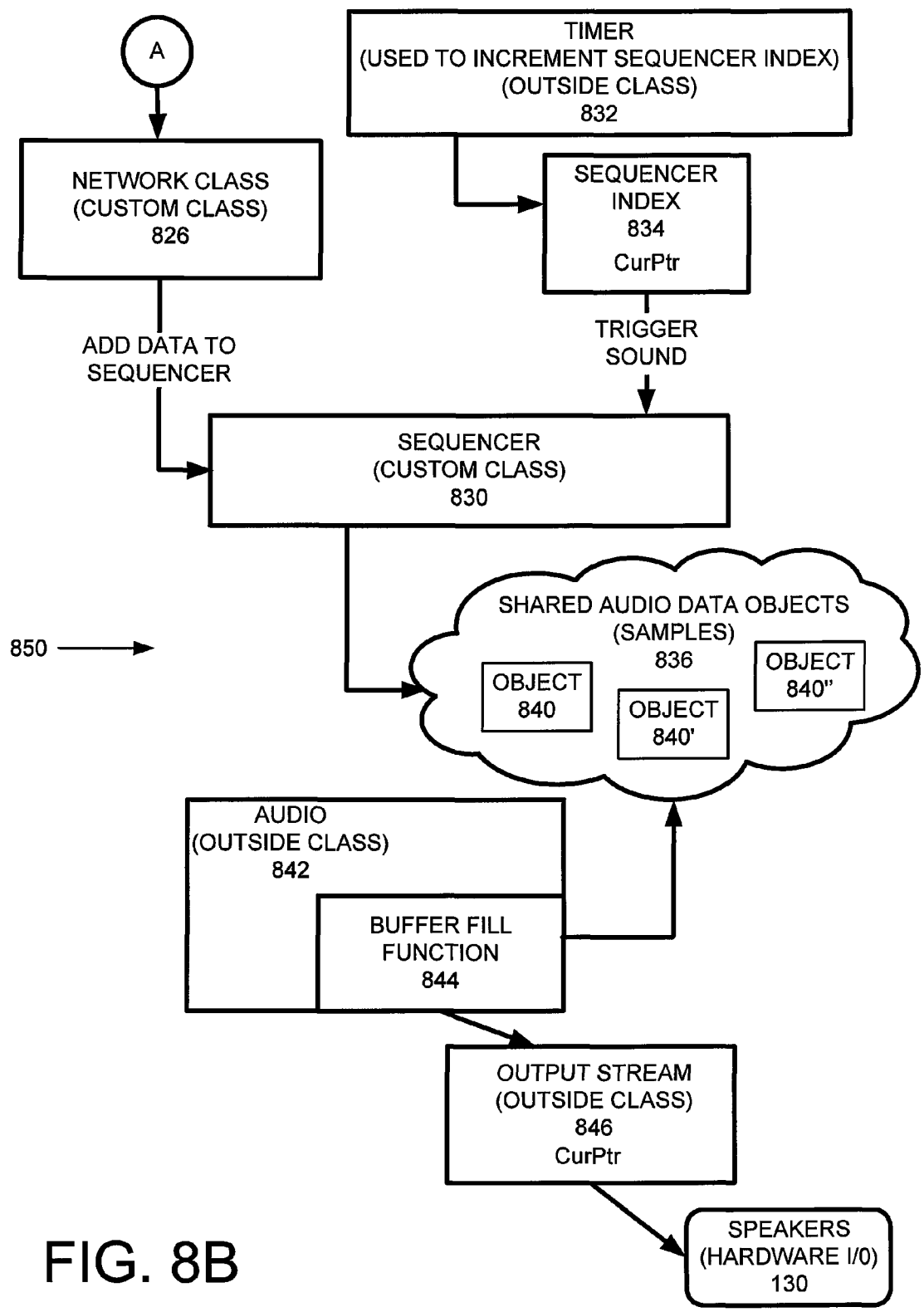
FIG. 8B is a diagram of object classes and their interactions executing on a remote host.
Figure 9:
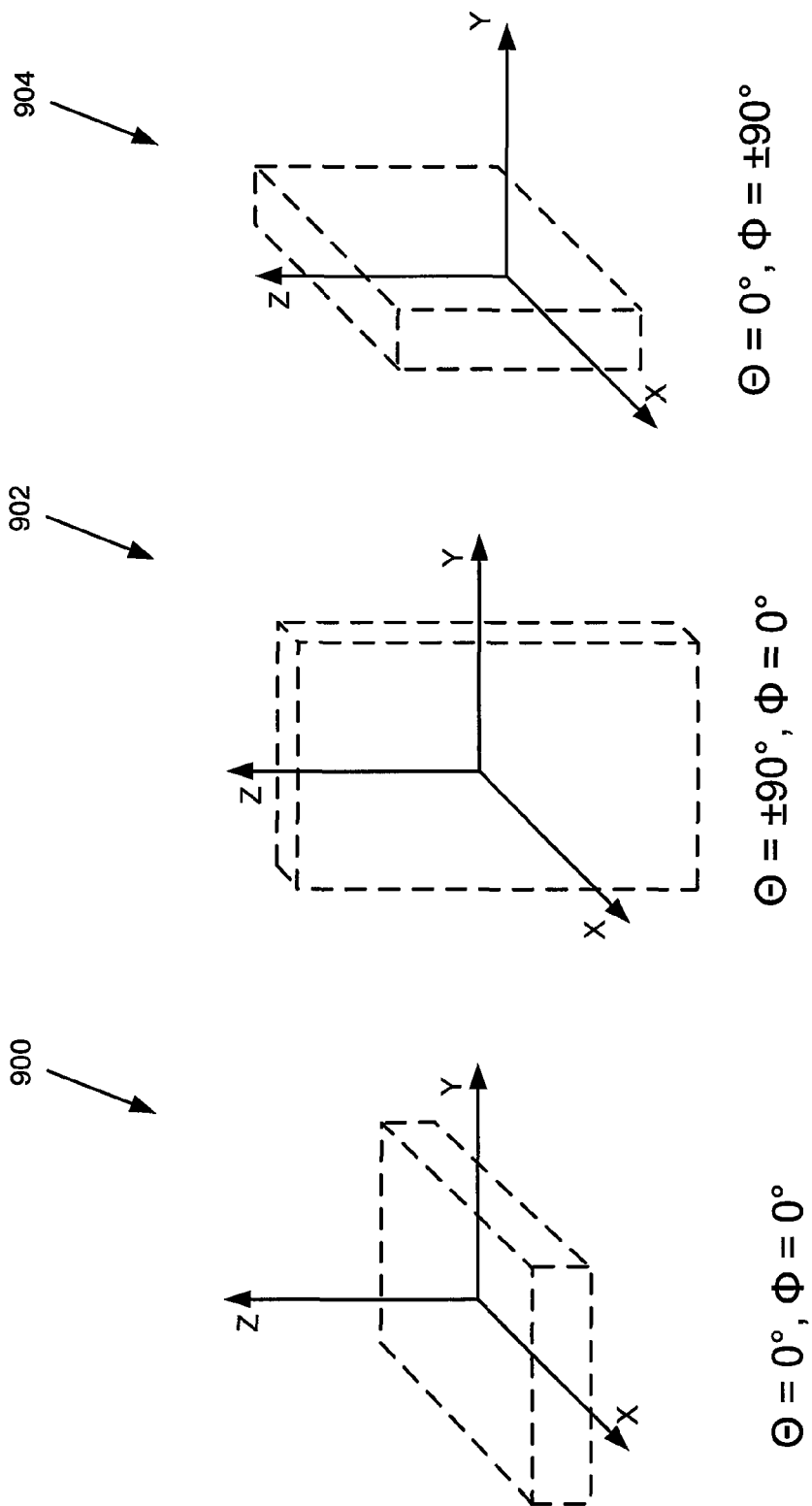
FIG. 9 is a diagram illustrating three planes within a three dimensional coordinate system for defining trigonometric relationships.

FIG. 8 and FIG. 9 illustrate objects for PMCD-to-Remote Host sequencing and audio generation. FIG. 8A illustrates objects executing on PMCD 100 which receive user gestures and audio recordings, process them, and send them to remote host 120 via a network link. Responding to menu command 814 to record audio, Main Application object 810 triggers Audio Recorder object 806 to provide recording functions. When a second menu command to cease recording is received, Audio Recorder object 806 returns with a string representing a filename assigned to the recorded audio file. Audio Recorder object 806 opens an Audio Input Stream object 804 when asked to start recording and streams audio data to a storage device as the recording continues. Audio data received from microphone 802 by Audio Stream object 804 is provided to Audio Recording object 806 where it is buffered locally. Upon receiving the second menu command 814 to stop recording, Audio Recorder object 806 closes and passes the buffered audio to Save File Object 808 which adds file header information to the file and passes the file name to Main Application object 810. Upon receipt of the filename notification, Main Application object 810 passes the file to Network object 820 which transmits the file at 824 to remote host 120 via communication channel 200 preceded by a message specifying a message type indicating an audio file type and the number of bytes to expect as illustrated in FIG. 4. In another embodiment, Audio Recorder object 806 can implement noise control to cancel out the sound from the PMCD's internal speakers.

Main Application object 810 also receives user gesture input data from keypad 230 comprising an identifier identifying the key pressed, or accelerometer input 240 consisting of the values of the three axes. Upon receipt keypad input 230, or accelerometer input 240, Main Application 820 passes the data to Preprocessor object 812 which, in the case of Accelerometer data 240, scales and smoothes the accelerometer axes data as will be discussed later in regard to FIG. 9 and FIG. 10. Preprocessed accelerometer data is then formed into a message complying with the Bluetaps Data Exchange message format wherein the message type field is provided with a value indicating sensor data. Data received from key presses of keypad 230 is similarly formed into a message complying with the Bluetaps Data Exchange message format wherein the message type field is provided a value indicating a note type message. Event notifications and messages for both keydown and keyup events are generated so that note duration may be calculated as the elapsed time between these events. Once each respective message has been formed, it is passed to Network object 820 where it is transmitted 822 to remote host 120.

In order to determine the tilt angle of the PMCD, the PMCD receives from the built-in accelerometer acceleration values for all three axes. To achieve a low latency during data transfer, in one embodiment of the present disclosure, the acceleration values are scaled down to fit into one byte each in order to fit all the sensor data into one Bluetooth™ L2CAP (lower protocol layer) frame.

Additionally, to ensure low latency communication between a PMCD and a remote host, in one embodiment music composition data messages communicating recorded audio are transmitted to remote host 120 using the Transmission Control Protocol (TCP), while music composition data messages communicating user gestures are transmitted to remote host 120 using the User Datagram Protocol (UDP). The use of TCP to communicate audio guarantees intact delivery of the audio from PMCD 100 to remote host 120 where, otherwise, the loss of any portion during transmission could result in noticeable artifacts when the audio is later synthesized by remote host 120.

FIG. 8B is an object diagram of the system shown in FIG. 6. FIG. 8B illustrates objects executing on remote host 120 which receive messages from PMCD 100, parses and records data necessary to compose, synthesize, transform and play the intended music. Remote host 120 receives Bluetaps Data Exchange messages from PMCD 100 through Network object 826. The Network object parses the Bluetaps Data Exchange message from the network layer and provides the message to Sequencer object 830. In one embodiment, remote host 120 executes a Sequencer object, written in Max/MSP, which communicates with PMCDs 100 to sequence the musical tracks. Each message sent from PMCD 100 to the Remote Host 120 begins with a track identifier followed by the message type and optional message parameters. For the transfer of a voice recording the Network object 826 receives audio file data from the Network link and writes it to a file on a storage device. When the transfer is complete the external sends a message signaling that there is a new sound file ready to be read into a buffer object.

On remote host 120, Sequencer object 830 records, loops, and plays back user gestures including hits mapped to percussive instruments and keypad presses mapped to melodic instruments as previously described in connection with FIG. 3. By default, the recorded events start the play back in a loop after 8 bars of 4/4. These values may be changed to support songs in different meters and lengths. Sequencer object 830 also stores accelerometer tilt information that is used to manipulate the looped recorded tracks when the tilt data has been mapped to effects including delay lines, panning, tremolo and vibrato.

As discussed above in reference to FIG. 4, Sequencer object 820 maintains a two dimensional array of event data, indexed by time and track number to store pitch and velocity for each event. When Sequencer object 830 receives a hit event or a note event it quantizes the data to the nearest ⅛ note and stores the quantized value in the appropriate track at the corresponding index in the array. Each quarter note is divided to twelve subdivisions allowing for rhythmic densification by a factor of 3 (leading to 1/16 triplets). Sequencer object 830 also stores control data for each subdivision which is not quantized. When Sequencer object 830 receives a clock tick event message from Timer object 832, also referred to herein as a "bang" message, it increments Sequencer Index 834 to point to the next index and sends out the corresponding event and control data. Using this method the sequencer is totally independent from the actual tempo and can perform expressive musical transitions including "accelerando" and "ritardando" transitions by changing the speed in which the "bang" messages are sent.

Additionally, whenever audio is received by remote host 120, the audio will be chunked by audio object 842 by applying a peak detection algorithm. Chunking the audio allows a user to skip through different audio chunks by pressing the on-screen keyboard as will be described below.

A single sequencer index maintains the current playback position for all tracks. Each time the sequence index is incremented, note data from the indexed position is read from each track sequentially. If the indexed position in a particular track indicates a note or beat should be sounded, a notification is sent to Audio object 842 for synthesis by Output Stream object 846 and playback through speakers 130. If a percussive instrument is sounded, a sound file representing the sound of the particular percussive instrument is sent to the Audio object 842 for synthesis. For melodic instruments, a note defined in terms of pitch frequency and duration is retrieved from the indexed position in the respective track and sent to the Audio object 842 for synthesis. Voice and audio recordings are stored in memory as Shared Audio Data Objects 836 represented by sound files 840. If an audio track indicates that a particular audio recording should commence playing, the sound file is retrieved from memory and sent to Audio object 842 for syntheses. Tempo is set by the speed with which the pointer is updated. Obtaining a faster tempo is accomplished by incrementing the sequencer index 834 at a faster rate. Conversely, the tempo can be slowed by decreasing the rate of sequencer index 834 increments. Once sequencer index pointer 834 reaches the final index, the next increment will cause the Sequence Index 834 wrap around to point back to the head of the track and thereafter will loop continuously in such manner until a message to stop playing is received.

FIG. 9 illustrates axes about which PMCD 100 may rotate. Gestural information obtained from rotation about the rotational axes of PMCD 100 enables the user to change parameters affecting the real-time performance of the musical composition. In one embodiment, users may tilt PMCD 100 continuously in three dimensions to effect rhythmic and timbral transformations of the previously recorded tracks. This gestural capability provides for creation and modification of the real-time performance of compositions in an expressive, motion-based manner. Similarly, global effects can be applied to the user-created composition through interpretations of user motions with PMCD 100. Such motions include various sweeps and rotations around different axes which are then mapped to particular effects including effects such as increasing the real-time volume or tempo of a composition.

The three dimensional accelerometer parameters indicate the current position of PMCD 100. These parameters themselves are only able to express the relative information about the movement of the cell phone. However, by using the gravity force, we can obtain the absolute tilt and panning information of PMCD 100.

Figure 10:
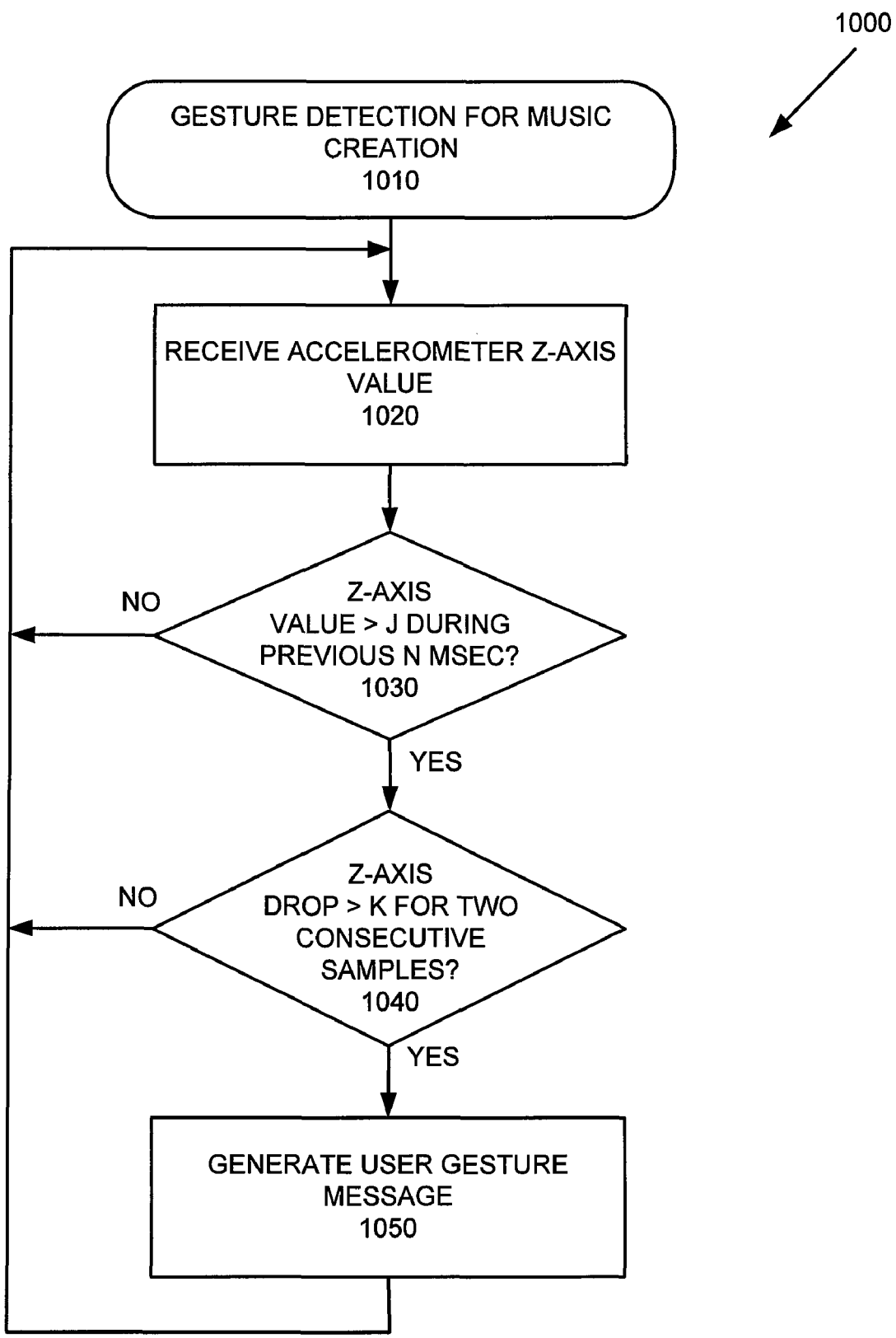
FIG. 10 is a block diagram of an algorithm for detecting gestures with an accelerometer.

FIG. 10 is a flowchart of one gesture detection algorithm for detecting "hits" and "shakes" of the PMCD using an accelerometer. For accelerometer-supported PMCDs, information from the 3D tilt axes is used to detect hits with lower level of latency. In order to detect hits independently of phone orientation, the derivative of the length of the acceleration vector is calculated and matched against a threshold J. To ignore a tail of possible fast multiple spikes after each hit, the derivative has to fall below a negative threshold before a second hit is detected. A tempo-dependent time threshold k is used to limit the speed in which hits can occur. The acceleration data is smoothed using moving average in an effort to detect intentional gestures and ignore accidental movements.

In one embodiment, hit detection is calculated from tilt and roll information. The hit detection function uses a bandpass filter on the z-axis, filtering with adjustable lowpass and highpass coefficients, nominally 0.85 (for lowpass) and 0.75 (for highpass). The filtered and scaled (between −1 and 1) signal is then tested for a high value (above the threshold 0.01) followed by a zero crossing. If these requirements are satisfied, then a hit is detected.

In another embodiment, the hit detection algorithm will remember the previous value of the accelerometer and compare it with the current one. If these two values have different sign and a absolute difference larger than 30, the program will treat it as a valid hit and send an user gesture message to remote host 120. After a valid hit detection, this algorithm will stop receiving sensor data for a predetermined number of frames in order to avoid false detection.

Figure 11:
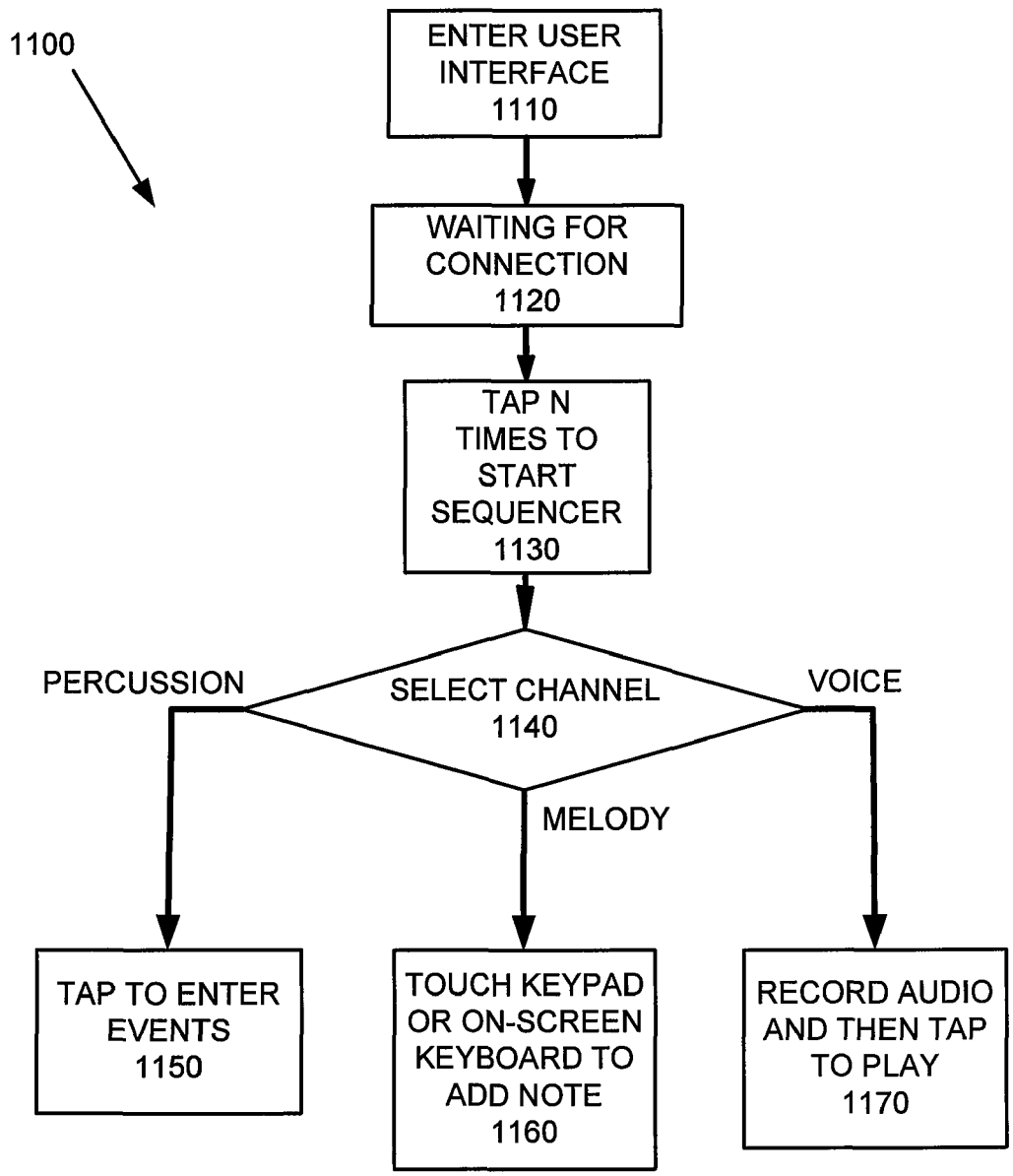
FIG. 11 is a block diagram of a client application executing on a personal mobile communication device, in one embodiment of the systems and methods disclosed herein.

As discussed above, in order to create music on remote host 120 by passing music composition data messages from PMCD 100 via communication channel 200, PMCD 100 contains client logic 210 which is configured with logic for controlling the functions of PMCD 100 and responding to user gestures and events. FIG. 11 illustrates one embodiment of a user interface application 1100 configured in the logic of PMCD 100. At 1110 the application 700 is invoked by a user of PMCD 100 in order to create music interactively upon remote host 120. At step 1110 a network connection is established, as described previously in the discussion of FIG. 6. Following establishment of a network connection, the user is instructed to tap PMCD 100 to establish an initial tempo for the music. PMCD 100 receives the initial user gestures and transmits them to remote host 120. The user gestures are assigned to a default percussion recording track and once received, playback of a click track is started. The click track is a synthesized metronome which provides audible feedback to the user in the form of audible beats occurring as quarter notes at the tempo set by the user's initial gestures. Once the initial tempo is established and the metronome started, the user may select different channels to modify or record at decision point 1140 in order to record additional percussion, melodic, and audio tracks or the user may choose to modify existing recordings. If the user selects "percussion" at decision point 1140, the user may select the percussive instrument to assign to a percussive track and then may tap PMCD 100 (block 1150) to generate percussive events which are mapped to the selected track. Selecting a melodic track allows the user to choose melodic instruments to assign to the available melodic tracks and to enter notes (block 1160) by pressing keys or using a touch screen interface. Selecting audio allows the user to record audio (block 1170) with the microphone and add it to the selected track or send audio recorded form phone calls or from other sources. Once the audio is sent, the user makes a further gesture to indicate the temporal point in the sequencer's continuous looping at which playback of the recorded audio is to begin. Following the completion of each selection, the user interface returns to decision point 1140 to await the next selection.

In another embodiment of the present disclosure, sequencer 320 supports 9 tracks: tracks 1-3 for drum sounds (using "taps"), tracks 4-6 for melodic sounds (using keypads presses) and tracks 7-9 for voice (using the internal microphone, received phone calls or audio files). Upon starting the application, the user hits the drum 4 times to determine the tempo of the sequencer. A metronome track begins to play back and the user can strike the phone to create the first drum track. Users can either hold the phone stable with one arm and hit it with the other arm; hold the phone with the hitting arm and hit any other surface (preferably soft surface like the other arm); or shake the phone with only one arm, which requires some practice to get reliable discrete hit detection. The track starts playing back in a loop according to the pre-designed loop length. The internal synthesizer, developed in Max/MSP, is responsible for generating the drum and melodic sounds in tracks 1-6. At any point the user can tilt the phone to manipulate the stored events. By default, the accelerometer's z-axis manipulates the rhythm by sub diving each recorded hit by 2 (300-360 degrees) or 3 (180-240 degrees). Keeping PMCD 100 in relatively straight angle (240-300 degrees) maintains the original rhythm with no change. The x-axis is mapped to panning (moves the sound through the stereo field—left to right), tremolo (which becomes faster by tilting the phone further to the left) and vibrato (which becomes faster by tilting the phone further to the right). These effect transformations are performed in Max/MSP using Digital Signal Processing (DSP) techniques.

At any time, the user can switch to another track using the up/down keys on the phone. The phone provides display of current track status. The previously recorded tracks are played in a loop along with the last cycle of tilt-generated transformations. The user can listen to the previous tracks as he enters new notes and control information in the new tracks. Tracks 4-6 are mapped to different MIDI channels in Max/MSP soft and allow user to play melody lines in an octave range (using the 12 phone keys). Sequencing of these tracks is similar to this in the drum tracks (tracks 1-3), although here the notes' pitch and length are also recorded and played back. Tracks 7-9 are used for voice recording, utilizing the Max/MSP groove and buffer objects. The record audio buffer can be of any length, limited only by storage capacity on the host computer. After recording, users can hit the phone to trigger the audio and to stop hit by a second hit. The audio can be manipulated by tilting in which the z-axis is mapped to playback speed switching from double time to half time and the x-axis is mapped to panning, tremolo and vibrato, and similarly for all the melodic MIDI tracks. For all 9 tracks pressing 'clear' erases the current track allowing the user to record new input instead. Pressing 'stop' while in Track 1 stops the application and allows for a new song in a new tempo to be entered. After creating musical tracks, users can share them with other Bluetaps client PMCDs 100 by synchronized tap gestures.

FIGS. 12A-12G illustrate a more detailed flowchart 1200 of the user interface decision tree for PMCD 100 as described above. At 1202 a start screen is displayed and the PMCD 100 attempts to connect to remote host 120. No sound is generated during this initial period. At 1204 the user is requested to make a series of user gestures, in one embodiment a series of taps, in order to establish the initial tempo. Once the gestures have been made, a metronome begins playback as described above. Following step 1204, the interface displays the default percussion track at step 1206 and is presented with choices 1208 to clear all tracks, 1210 to clear track one, 1212 to tap the phone to add bass drum beats to the sequencer, 1214 to change track by pressing 'up' or 'down', and 1216 to increase or decrease the tempo by pressing 'left' or 'right.' Steps 1208 will clear all tracks and return the interface to step 1202 in which PMCD 100 connects with remote host 120 and then repeats the steps described above. Selection of options 1210, 1212, and 1216 will return the interface to step 1206 following execution.

Figure 12A:
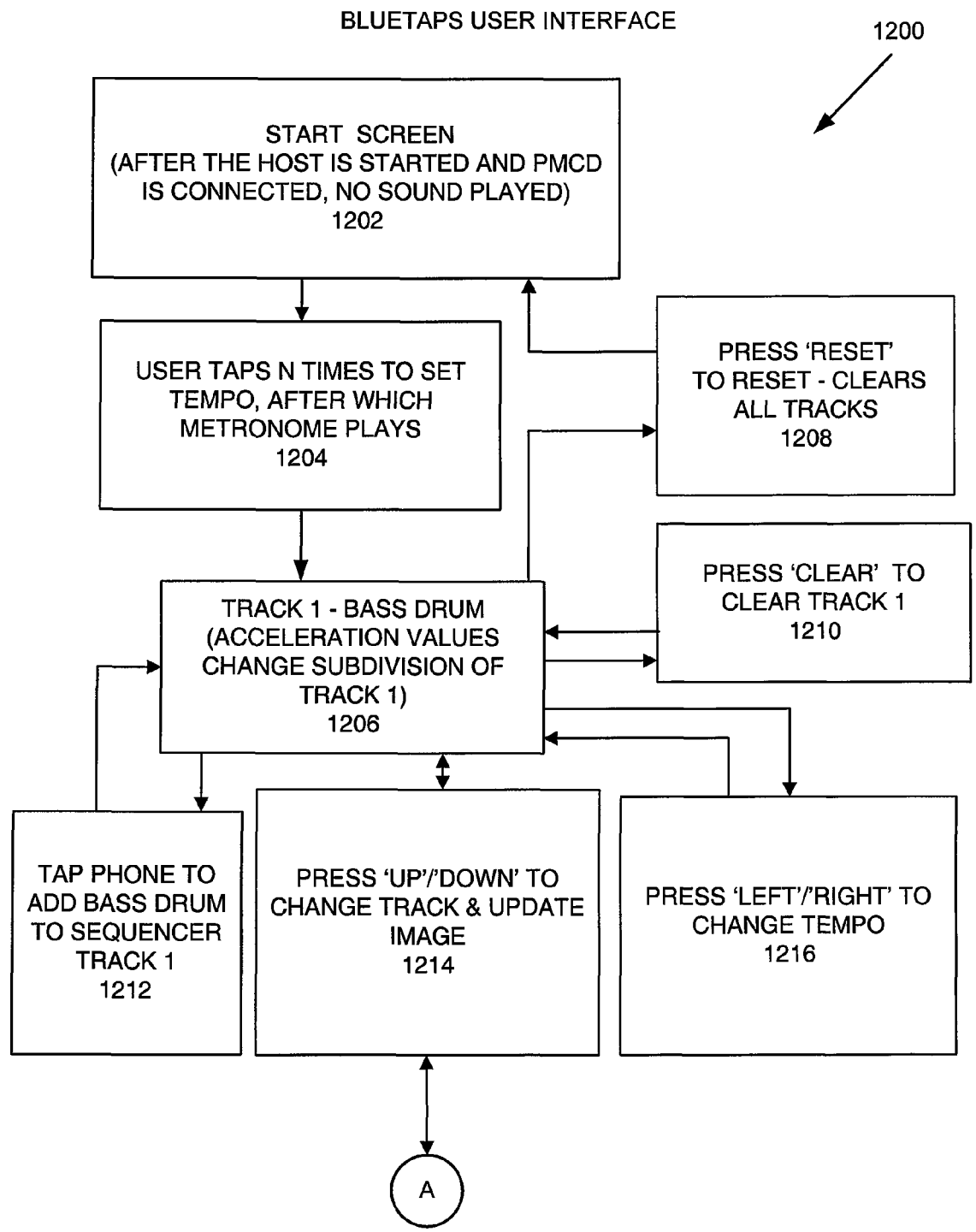
FIGS. 12A-12G are block diagrams of a user interface algorithm for implementing user control of BlueTaps on a personal mobile communication device.
Figure 12B:
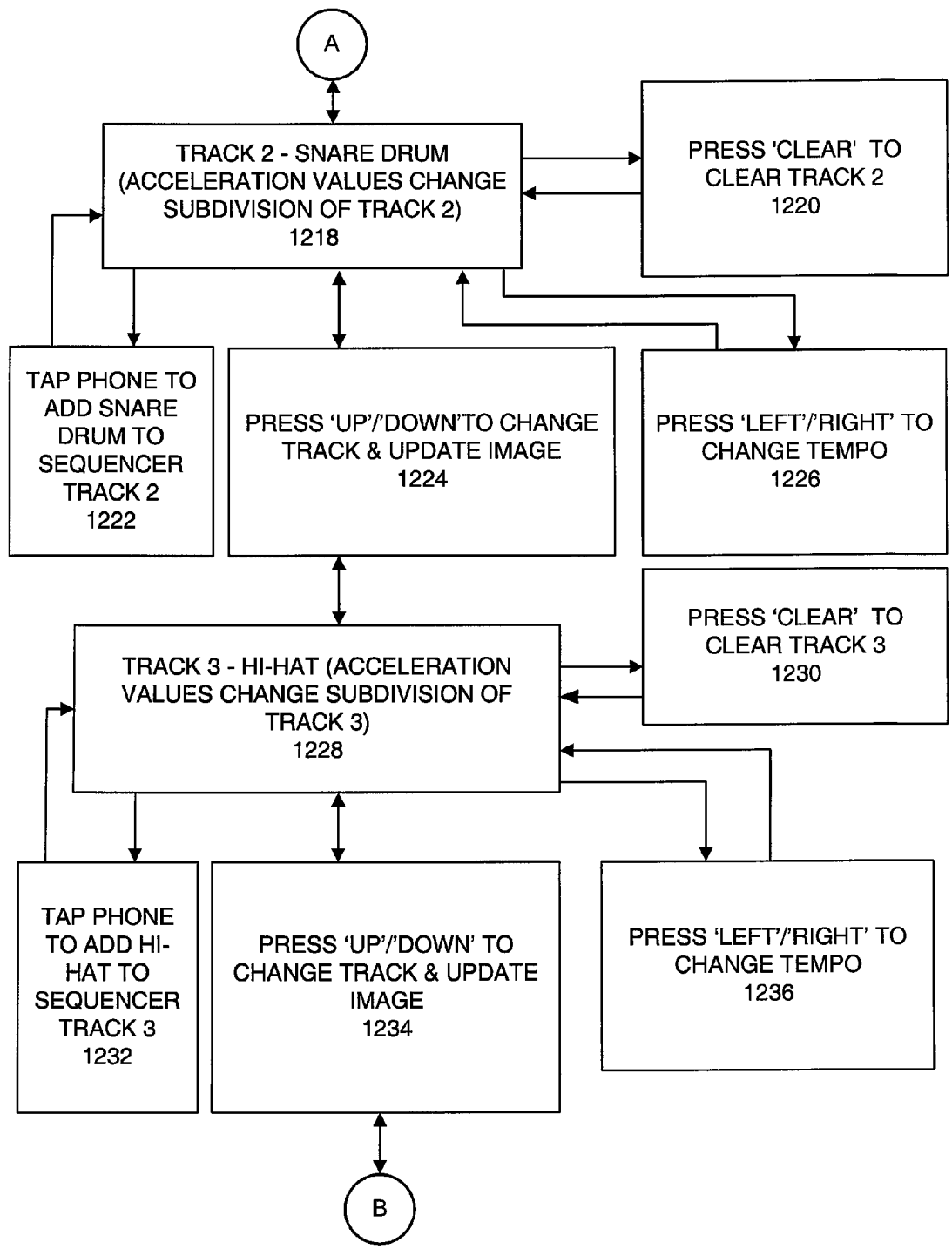

If step 1214 is selected to change tracks, the interface continues to step 1218 shown in FIG. 12B which allows the user to enter, in one embodiment, percussion information for track 2. Similar selections from step 1218 are available to the user as in step 1206, namely, 1220 to clear track 2, step 1222 to add hit data to the track 2, step 1226 to increase or decrease the tempo, and step 1214 to change back to step 1206 or step 1224 to change to another track by proceeding to step 1228.

Step 1228 allows the user to enter hit data for percussion track 3 and presents similar options as presented in relation to step 1224, namely, step 1230 to clear track 3, step 1232 to add hit data to track 3, step 1236 to increase or decrease tempo, step 1224 to return to step 1218, and step 1234 to change to another track by proceeding to step 1238.

Figure 12C:
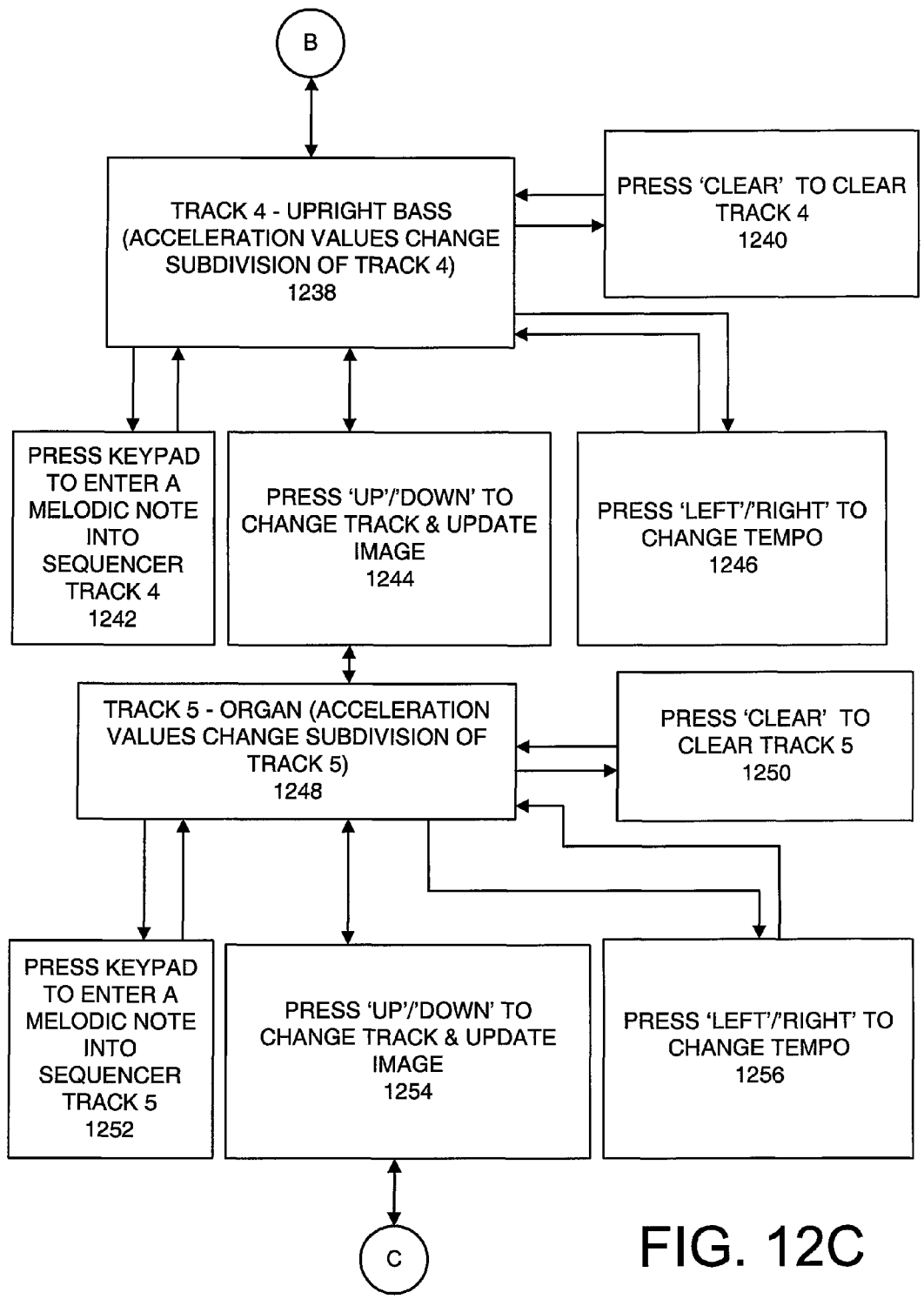

As shown in FIG. 12C, step 1238 allows the user to enter melodic data for track 4 and presents similar options as presented in relation to step 1228, namely, step 1240 to clear track 4, step 1242 to add note and duration data to track 4, step 1246 to increase or decrease tempo, step 1234 to return to step 1228, and step 1244 to change to step 1248. Selecting step 1244 allows the user to enter melodic data for track 5 and presents similar options as presented in relation to step 1238, namely, step 1250 to clear track 5, step 1252 to add note and duration data to track 5, step 1256 to increase or decrease tempo, step 1244 to return to step 1238, and step 1254 to change to step 1258.

Figure 12D:
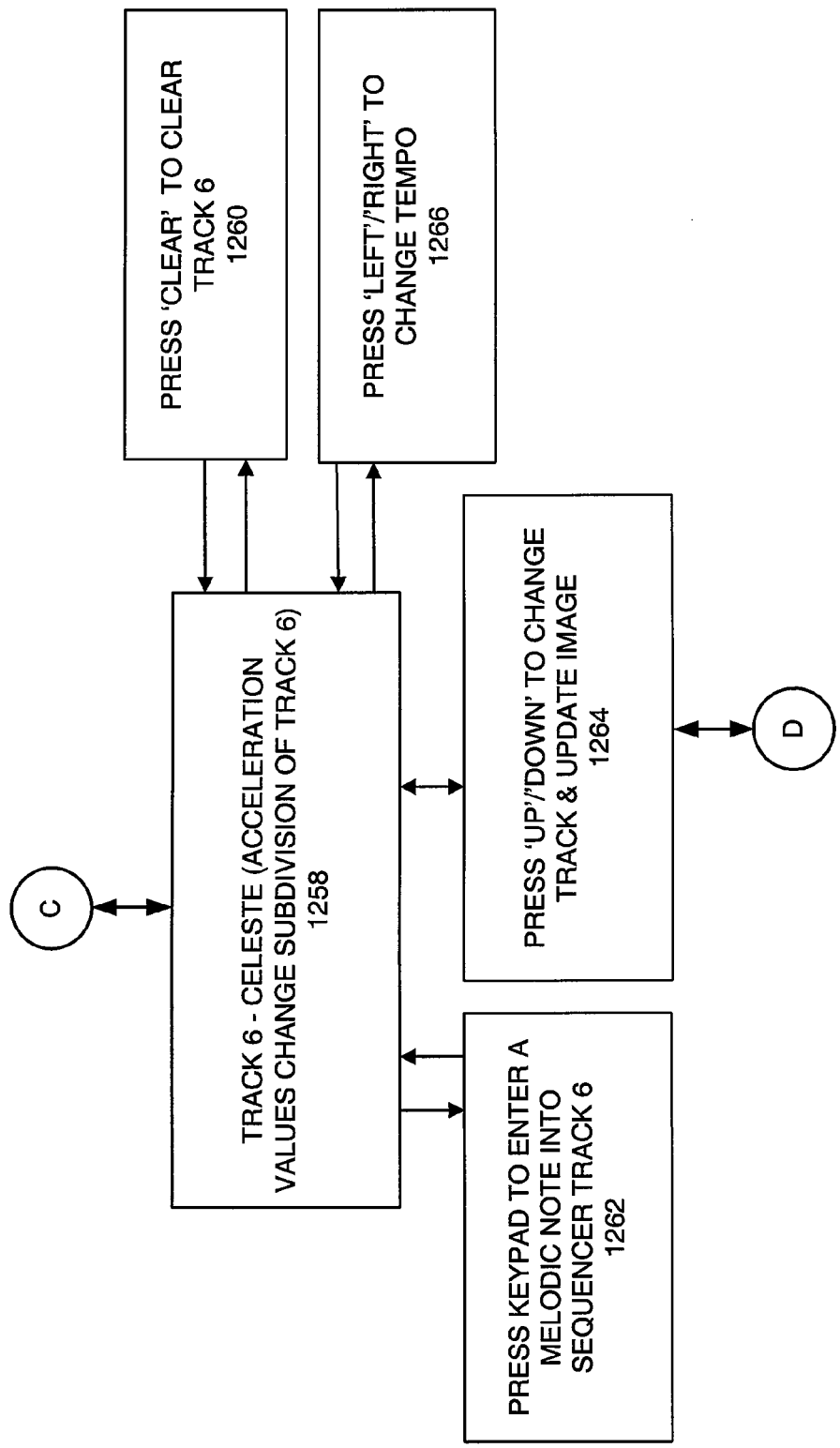

As shown in FIG. 12D, selecting step 1254 causes to user interface to enter step 1258 which allows the user to enter melodic data for track 6 and presents similar options as presented in relation to step 1248, namely, step 1260 to clear track 6, step 1262 to add note and duration data to track 6, step 1266 to increase or decrease tempo, step 1254 to return to step 1248, and step 1264 to change to step 1268.

Figure 12E:
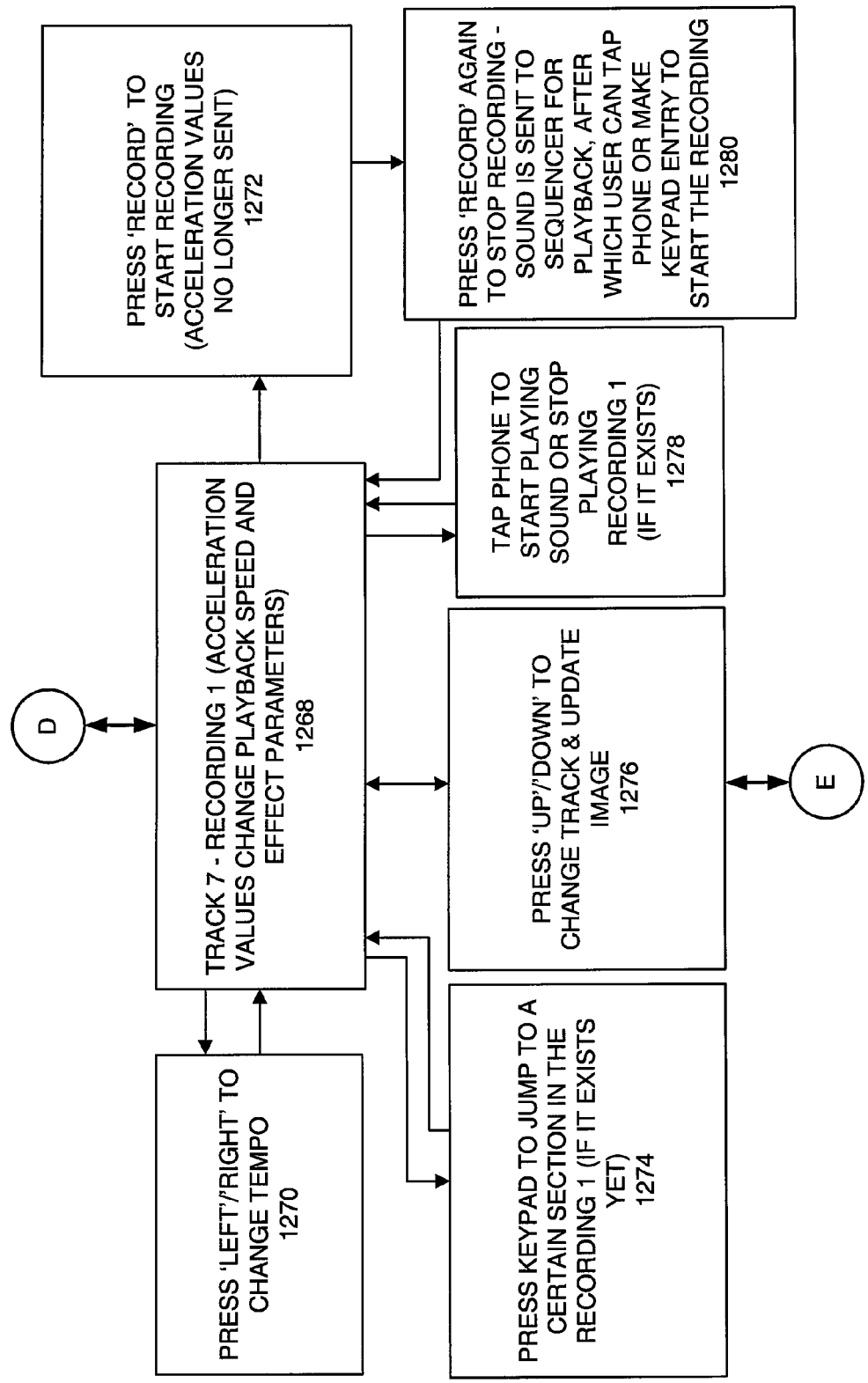

Selecting step 1264 causes to user interface to enter step 1268, as shown in FIG. 12E, which allows the user to enter audio data for track 7. From step 1268, audio may be recorded with PMCD 100 beginning at step 1272 in which "Record" is pressed to begin process of recording audio from the microphone. When the user determines that a sufficient amount of audio is recorded, 'Record' is pressed a second time to exit step 1280 to return to step 1268. When the user is ready to add the audio recorded during steps 1272 to 1280, at step 1278 a user gesture is used to indicate the point in the sequence loop in which to begin playback of the recorded audio. A second user gesture will cause the recording to stop playing in step 1278. Following each step 1278, the interface returns to step 1268. Step 1274 may be entered which allows a user to jump through sections of audio recorded in steps 1272 to 1280. Each time step 1272 is entered, a chuck of recorded audio is skipped. Step 1270 allows for an increase or decrease in tempo, step 1276 changes to step 1282, and selecting step 1264 returns to step 1258. While in step 1268, acceleration values obtained from accelerometer 240 will change the playback speed and effect transformational parameters.

Figure 12F:
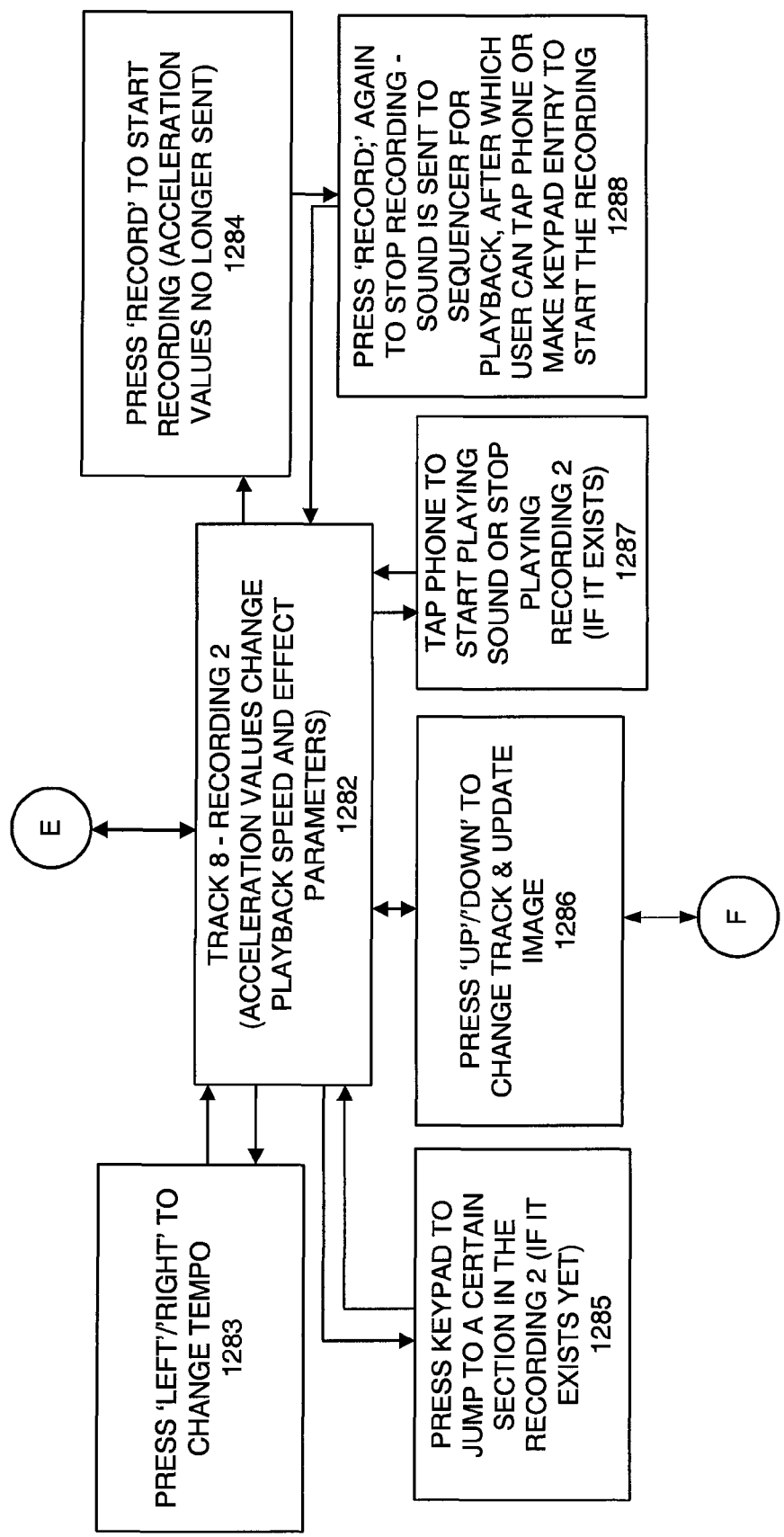

Selecting step 1276 causes to user interface to enter step 1282, shown in FIG. 12F, which allows the user to enter audio data for track 8. From step 1282, audio may be recorded with PMCD 100 beginning at step 1284 in which "Record" is pressed to begin process of recording audio from the microphone. When enough audio is recorded, "Record" is pressed a second time to exit step 1288 to return to step 1282. When the user is ready to add the audio recorded during steps 1282 to 1288, step 1287 is selected to indicate the point in the sequence loop in which to begin playback of the recorded audio. A second user gesture will cause the recording to stop playing in step 1287. Following each step 1287, the interface returns to step 1282. Step 1285 may be entered which allows a user to jump through sections of audio recorded in steps 1282 to 1288. Each time step 1285 is entered, a chuck of recorded audio is skipped. Step 1283 allows for an increase or decrease in tempo, step 1286 changes to step 1289, and selecting step 1276 returns to step 1268. While in step 1282, acceleration values obtained from accelerometer 240 will change the playback speed and effect transformational parameters.

Figure 12G:
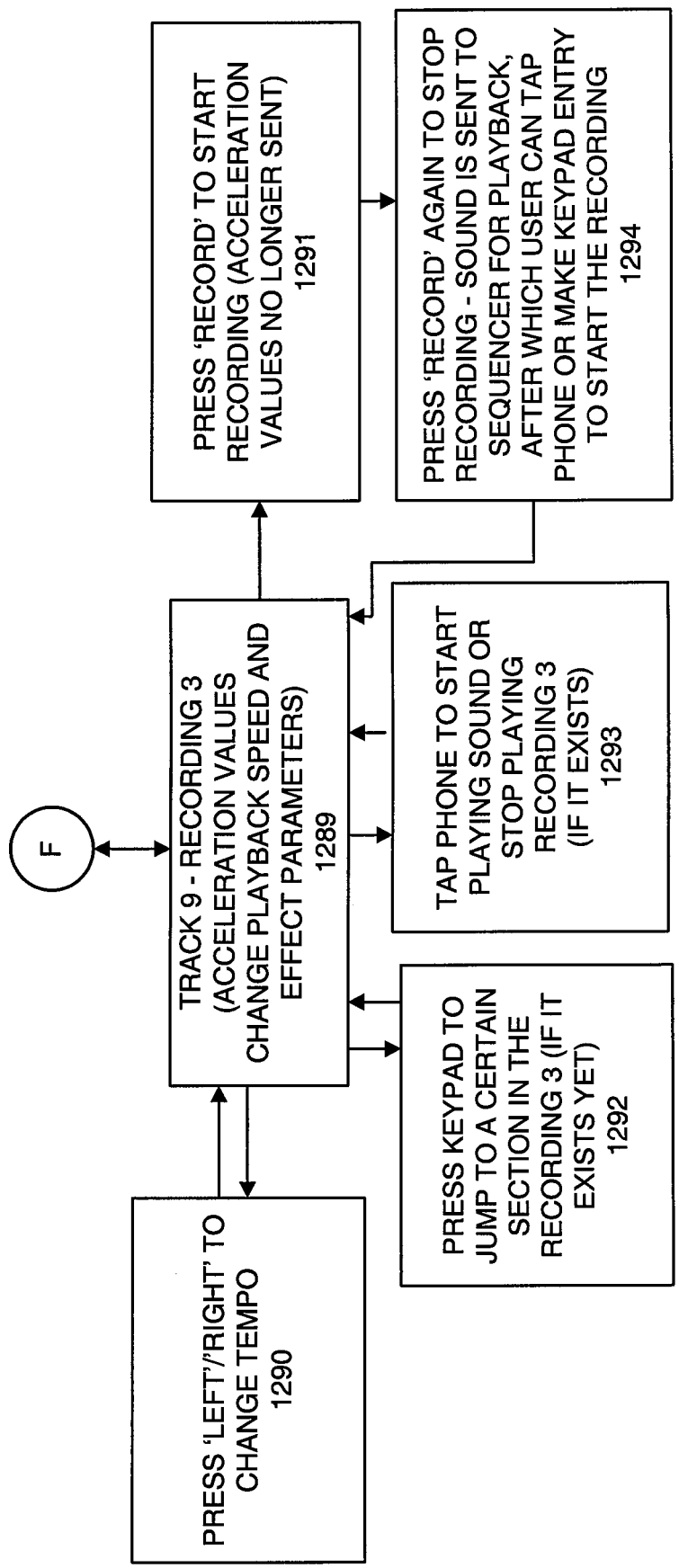

Selecting step 1286 causes to user interface to enter step 1289 which allows the user to enter audio data for track 9 as shown in FIG. 12G. From step 1289, audio may be recorded with PMCD 100 beginning at step 1291 in which "Record" is pressed to begin process of recording audio from the microphone. When enough audio is recorded, "Record" is pressed a second time to exit step 1294 to return to step 1289. When the user is ready to add the audio recorded during steps 1291 to 1294, step 1293 is selected to indicate the point in the sequence loop in which to begin playback of the recorded audio. A second user gesture will cause the recording to stop playing in step 1293. Following each step 1293, the interface returns to step 1289. Step 1292 may be entered allow a user to jump through sections of audio recorded in steps 1291 to 1294. Each time step 1292 is entered, a chuck of recorded audio is skipped. Step 1290 allows for an increase or decrease in tempo, and selecting step 1286 returns to step 1282. While in step 1289, acceleration values obtained from accelerometer 240 will change the playback speed and effect transformational parameters.

Figure 13:
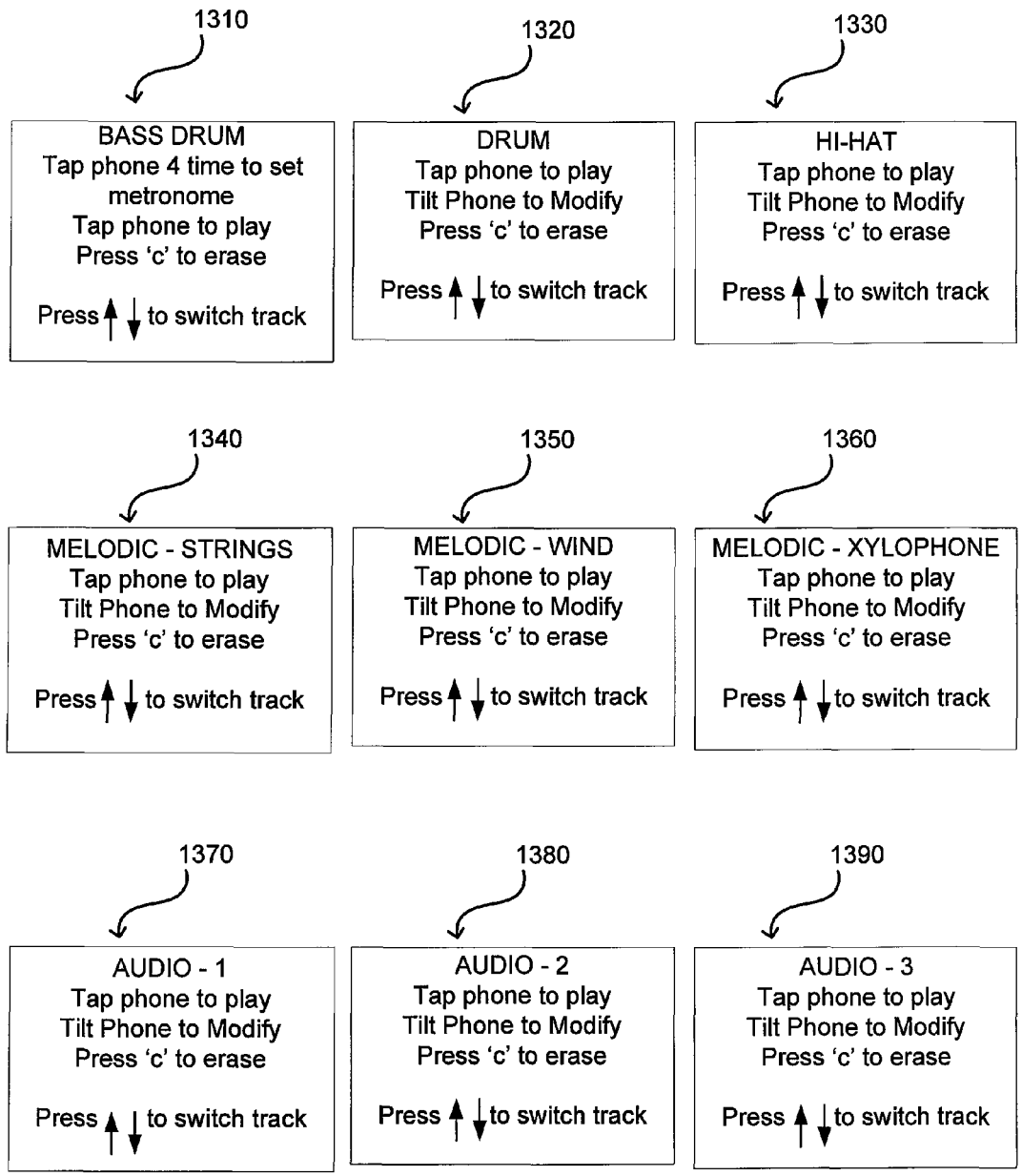
FIG. 13 is a series of user interface screens presented in conjunction with the user interface algorithm presented in FIGS. 12A-12G.

FIG. 13 illustrates several user interface screens presented to a user in coordination with the user interface flow detailed in relation to FIGS. 12A to 12G above. Screenshot 1310 is presented commensurately with steps 1202 and 1206. Screenshot 1310 is presented commensurately with step 1206. Screenshot 1320 is presented commensurately with step 1218 and screenshot 1330 is presented commensurately with step 1228. Screenshots 1340, 1350 and 1360 are presented commensurately with steps 1238, 1248 and 1258 respectively. And screenshots 1370, 1380 and 1390 are presented commensurately with steps 1268, 1282 and 1289.

Figure 14:
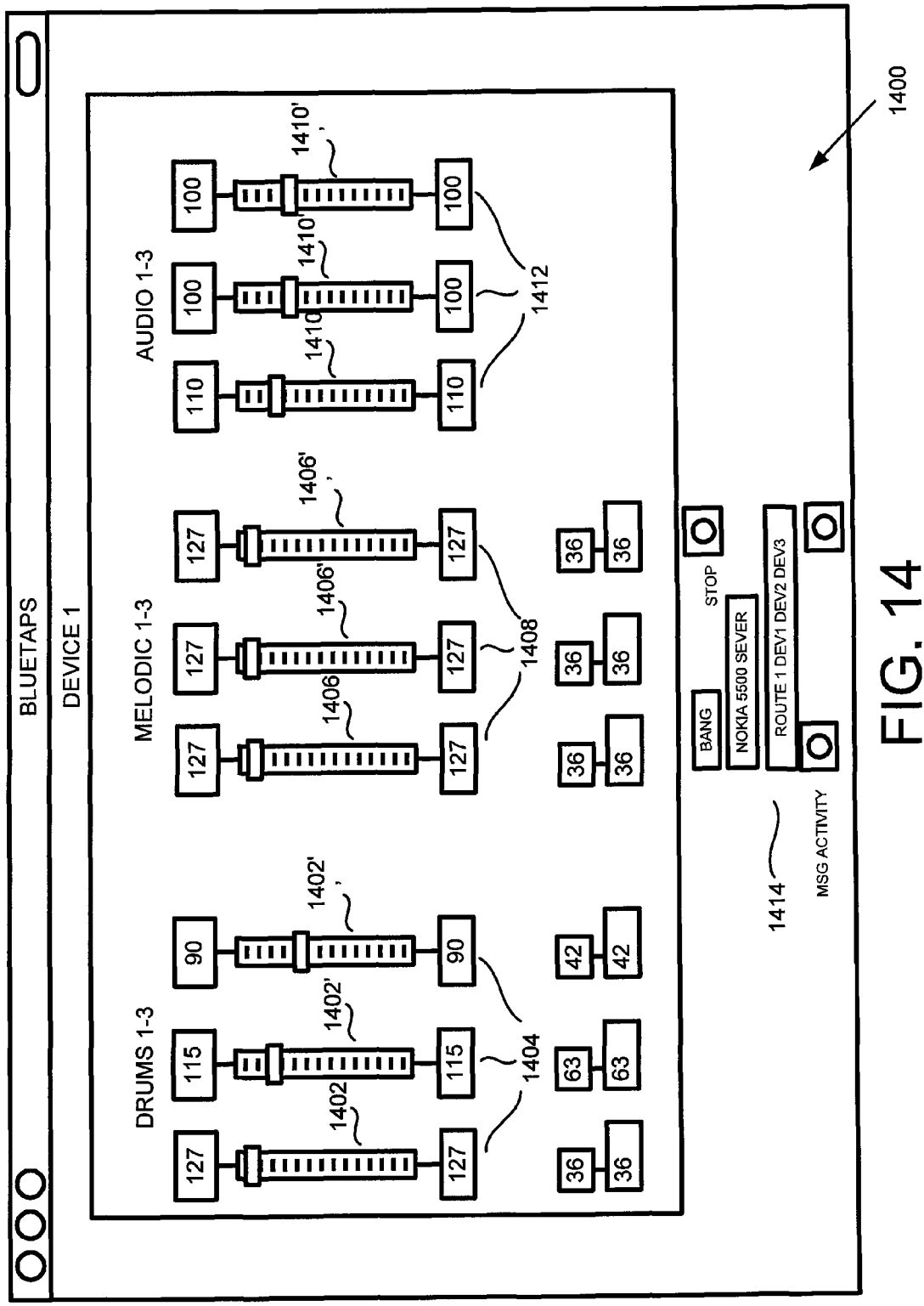
FIG. 14 is a screenshot of one user interface of an interactive music creation application executing on a remote host, in one embodiment of the systems and methods disclosed herein.

FIG. 14 illustrates one embodiment of an interface screen 1400 implemented by a remote host 120 for establishing instrument parameters affecting multiple tracks controlled by a single PMCD 100. The multiple tracks are divided into groups: percussion tracks 1404; melodic tracks 1408; and audio tracks 1412. Each track is assigned a slider to control the relative volume of the track during synthesis as shown. The interface further displays controls 1414 and information concerning the device connected, indications of message activity, and a control to initiate connection.

Figure 15:
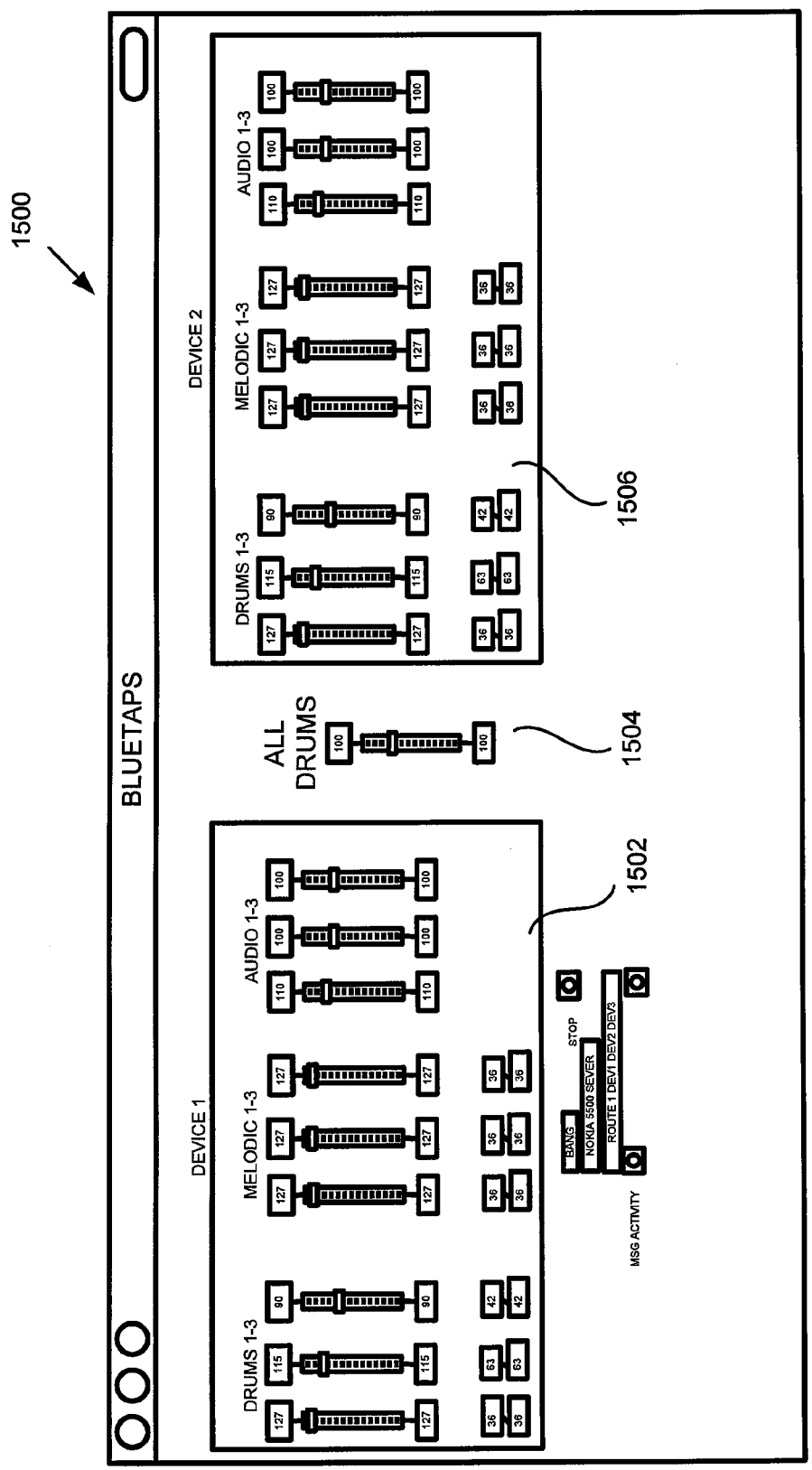
FIG. 15 is a user interface screen of an application executing on a remote host in one embodiment of the systems and methods disclosed herein.

FIG. 15 illustrates an additional embodiment of an interface screen 1500 implemented by remote host 120 in which two PMCDs 100 are connected to remote host 120. Parameters for device one are controlled in one area 1502 while parameters for a second device are controlled in a second area 1506. A global slider 1504 controls relative volume for all percussion tracks.

Figure 16:
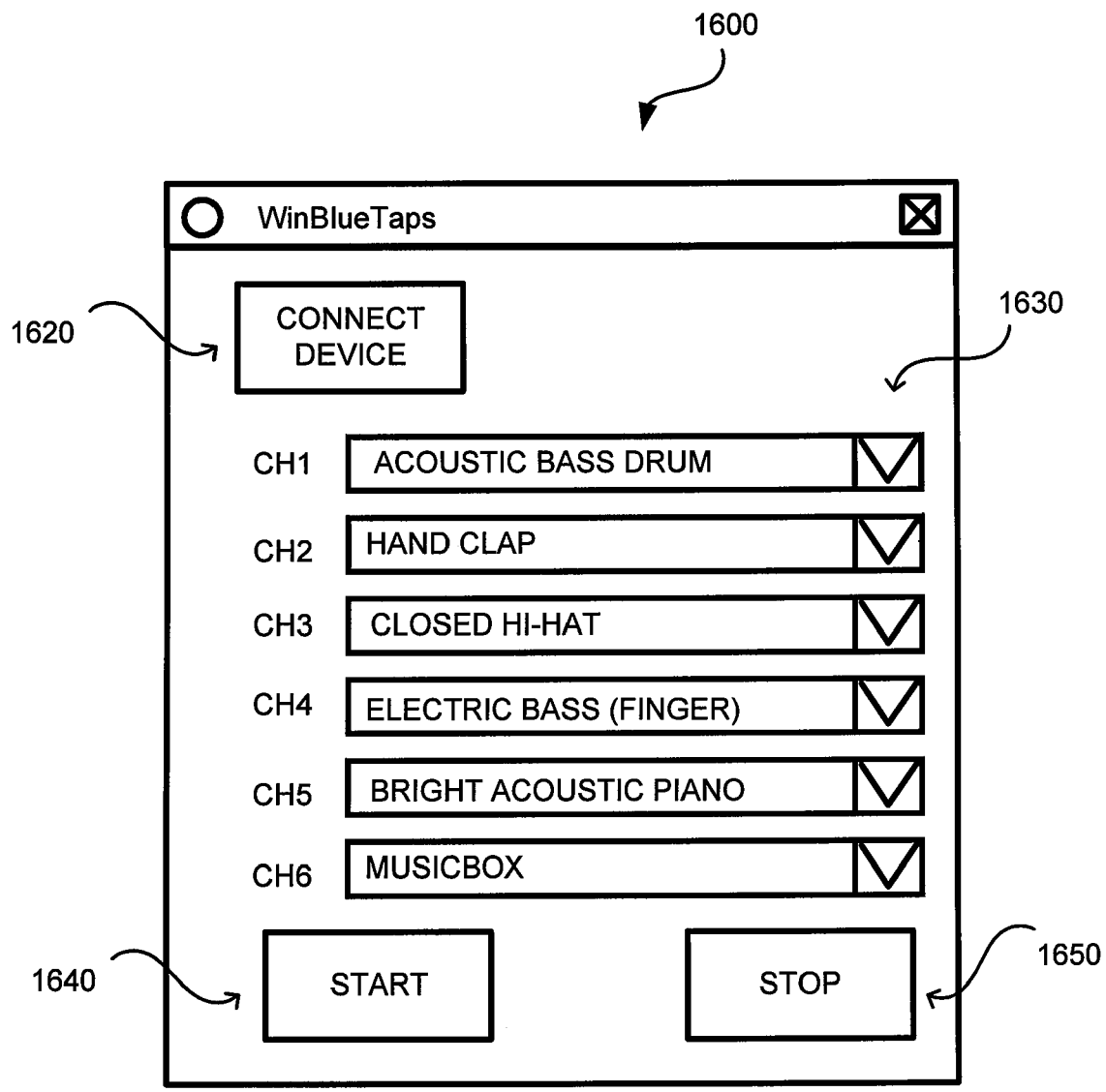
FIG. 16 is a user interface screen of an application executing on a remote host in one embodiment of the systems and methods disclosed herein.

FIG. 16 illustrates an additional control interface 1600 which provides a mechanism to associate individual tracks with individual instruments and with the PMCD which will control those tracks. Control 1620 allows a user to select a particular PMCD to connect with as will be described in connection with FIG. 17. A group of drop down boxes 1630 associate individual channels, or tracks, with an instrument selected from a list. Once configured, control 1640 enables the remote host to accept data from PMCD 100 and control 1650 halts the process.

Figure 17:
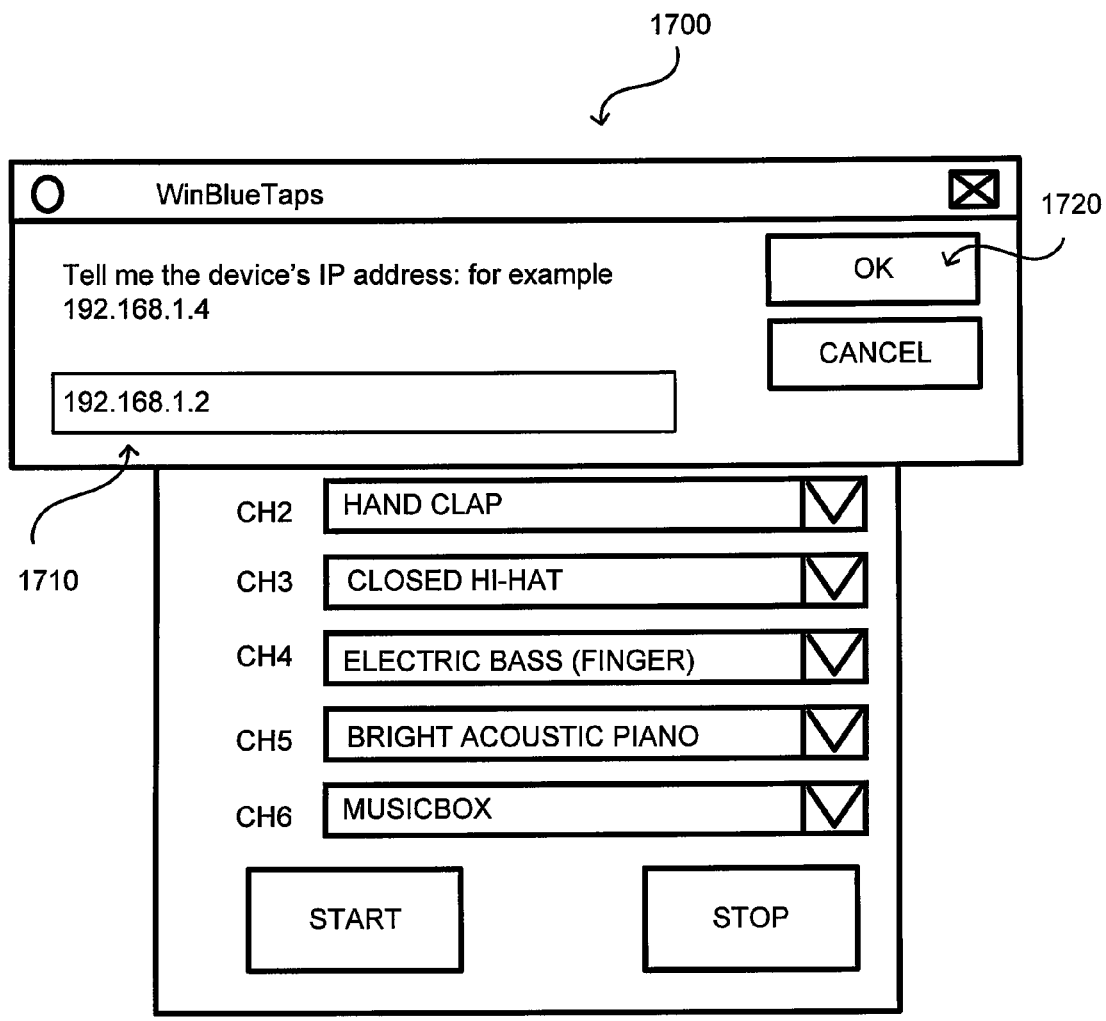
FIG. 17 is a user interface screen of an application executing on a remote host in one embodiment of the systems and methods disclosed herein.

FIG. 17 illustrates a window 1700 for entering the internet protocol (IP) address of a device with which to connect. The address is entered in text box 1710 and control 1720 is selected to accept the address.

Figure 18:
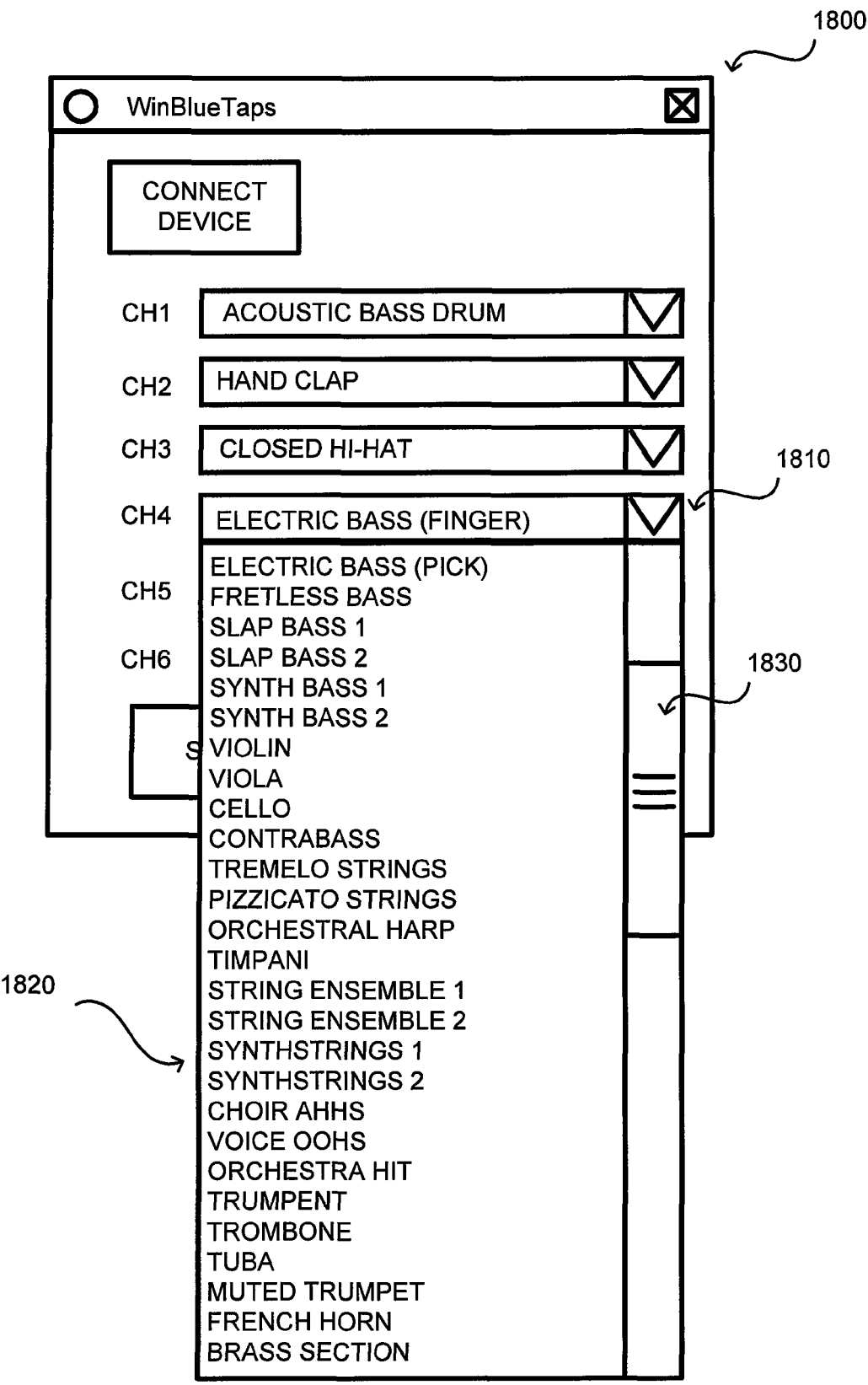
FIG. 18 is a user interface screen of an application executing on a remote host in one embodiment of the systems and methods disclosed herein.

FIG. 18 illustrates a window 1800 presenting a number of instrument choices, one of which is to be associated with a particular channel. Drop down box 1810 associate with channel 4 is configured with a plurality of choices 1820 from which a user may select the desired instrument. Thumb control 1830 is used to scroll down the list of more choices are available than can fit on the display at a given time. Once a choice is made, the name of the chosen instrument will be displayed as text in the control.

Figure 19:
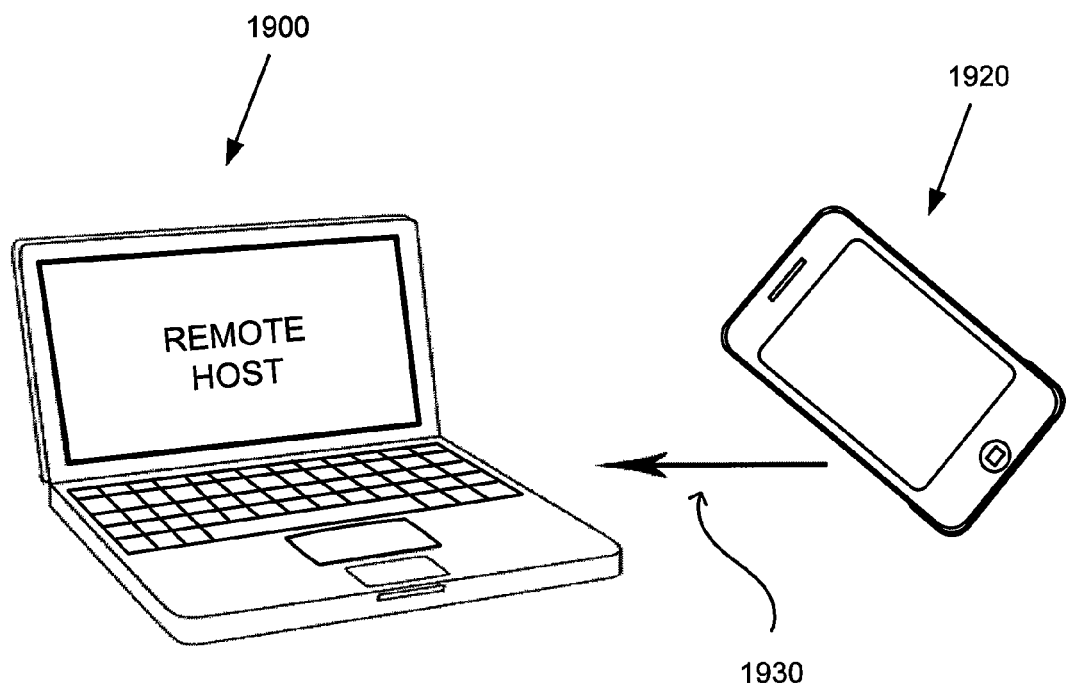
FIG. 19 is an illustration of a personal mobile communication device wirelessly communicating with a remote host, in one embodiment of the systems and methods disclosed herein.
Figure 20C:
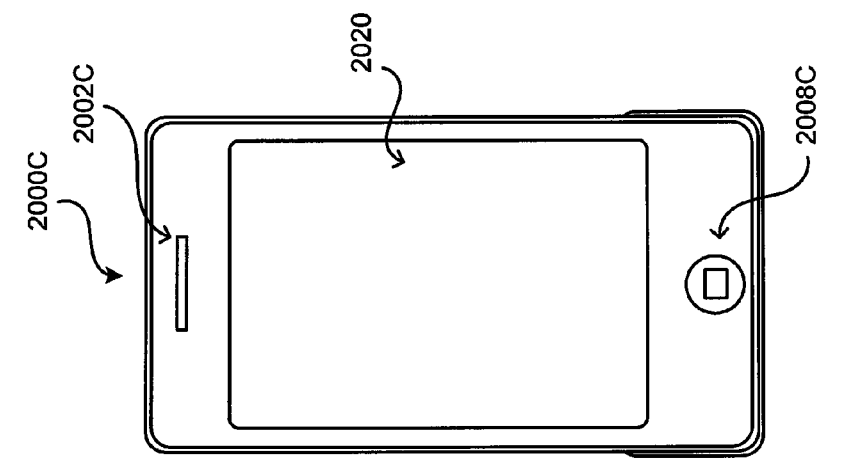
FIG. 20C is a representative diagram of an Apple™ iPhone™ mobile communication device.
Figure 20B:
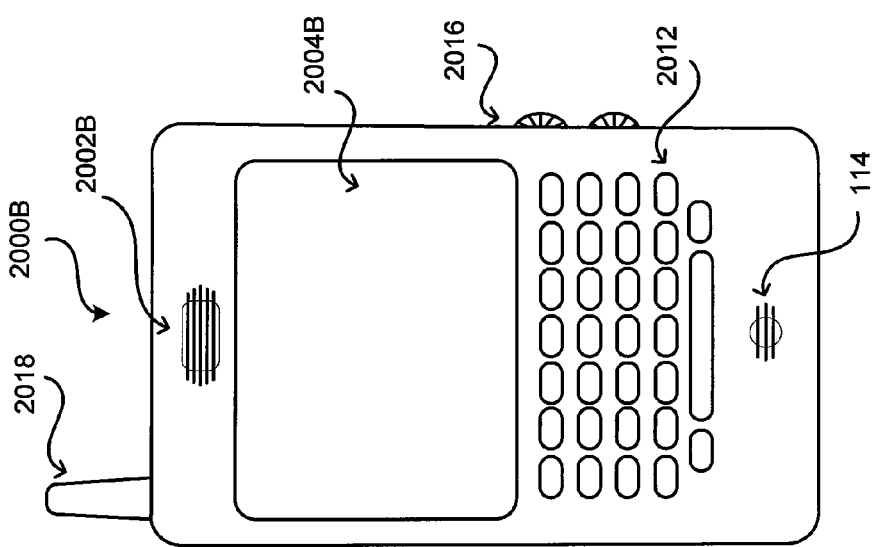
FIG. 20B is a representative diagram of a wireless personal digital assistant (e.g., a BlackBerry™, a Treo™, a PalmPilot™, etc.) mobile communication device.
Figure 20A:
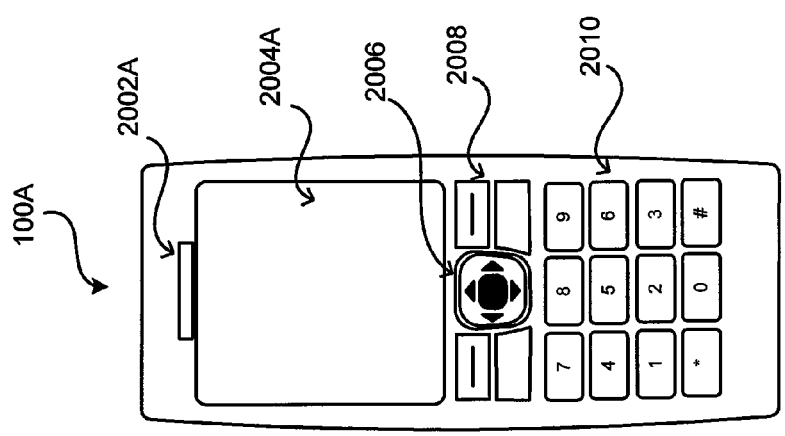
FIG. 20A is a representative diagram of a cellular phone mobile communication device.

FIG. 19 illustrates an additional embodiment of the present disclosure in which the remote host resides on a computer 1900 and PMCD 100 is an Apple™ iPhone™ 1920. Remote host 1900 and PMCD 1920 are connected via IEEE 802.11 (Wi-Fi™) illustrated herein as wireless connection 1930. FIGS. 20A-20C illustrate three representative examples of personal mobile communication devices. FIG. 20A is an illustration of a mobile cellular phone, 100A; FIG. 20B is an illustration of a wireless personal digital assistant, 100B; and FIG. 20C is an illustration of an Apple™ iPhone™, 100C. Each figure illustrates a general representation of a device which includes one or more user interfaces. Each user interface includes at least one microphone for capturing sound. Each device further includes a handheld case, a graphical display device for communicating text and/or graphics and a data entry device for the entry of user data, for instance keypad 2010, keyboard 2012, and touchpad 2020. These illustrations, however, are not intended to limit the applicability of the present disclosure to only these devices; embodiments of the disclosed system may incorporate other devices.

Each device illustrated in FIGS. 20A-20C includes an audio transducer for converting sound pressure waves into electrical signals and a speaker for the reverse conversion. An example of an audio transducer which converts sound waves falling within the frequency band of human speech is the microphone. In particular, FIG. 20B illustrates a microphone in direct communication with the external environment through aperture, 114, formed in case 2020. FIG. 20A and FIG. 20C illustrate devices which enclose a microphone entirely within each PMCD body and without an aperture to connect the microphone to either external environment.

Each device illustrated in FIGS. 20A-20C, is also capable of two-way voice communication via a radio connection with at least one wireless network. Device 100B illustrates one embodiment in which an external antenna 2018 is present for wireless transmission and reception capability. In another embodiment, a system does not include an external antenna, but includes instead an internal antenna for wireless connectivity with external networks. Examples of the latter systems are illustrated by devices 100A and 100C. Each PMCD, 100A-100C, includes at least one wireless communication transceiver module. In some embodiments the transceiver communicates with a cellular radio network. In other embodiments, the transceiver communicates with Bluetooth™, IEEE 802.11 Wi-Fi™, WiMax™, or other wireless networks.

Figure 21B:
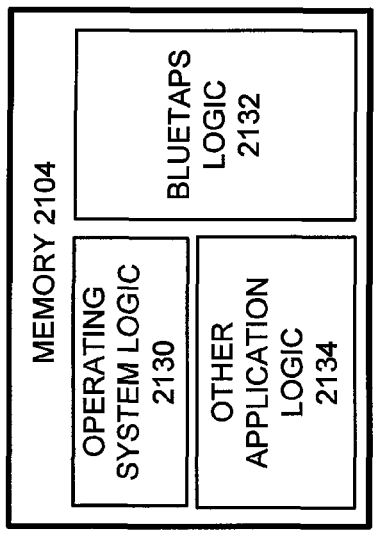
FIG. 21B is a memory block which may include, but is not limited to, allocations of memory containing logic for an operating system, allocations of memory for a user gesture detection application, and allocations memory for other additional applications.
Figure 21C:
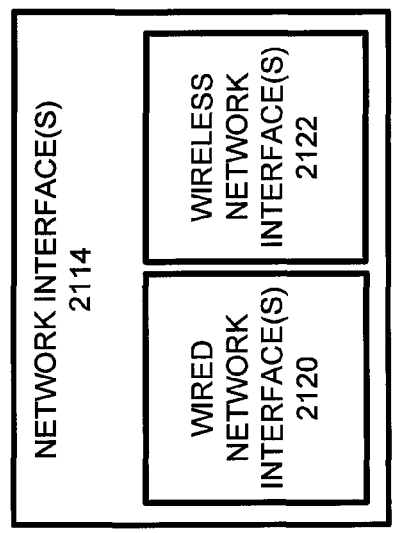
FIG. 21C is a network interface block which includes interfaces to external networks.
Figure 21A:
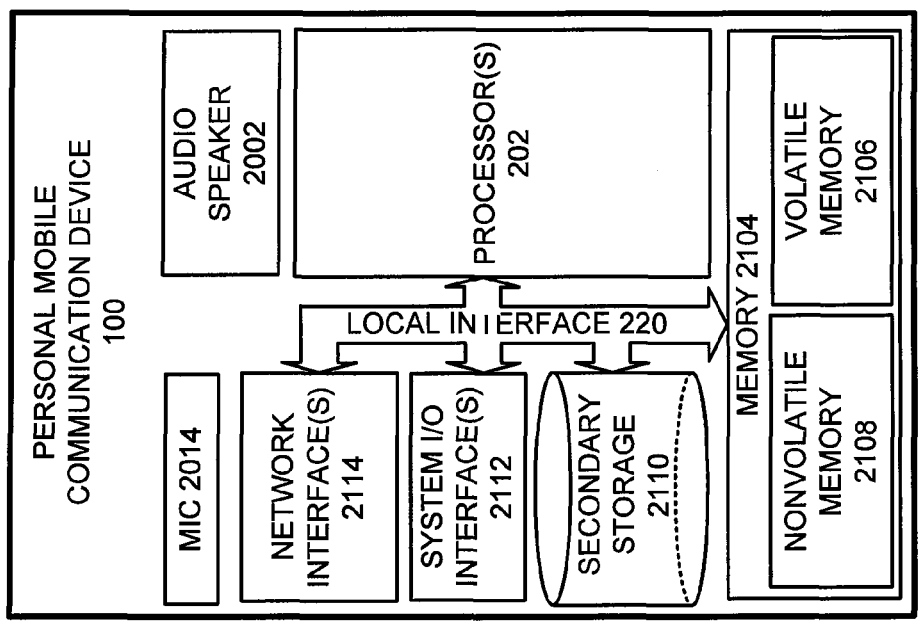
FIG. 21A is a basic mobile communication device.

FIGS. 21A-21B illustrate a representative block diagram of one architecture for an embedded computing and communication system of which PMCDs 100A, 100B, and 100C are examples. FIG. 21A illustrates an internal block diagram of an architecture for PMCD 100 which comprises several blocks including processor 2102, memory sub-system 2104 comprised of volatile memory 2106 and nonvolatile memory 2108, secondary storage 2110, system input/output interface block 2112, network interface(s) 2114, microphone (Mic) 2116, and audio speaker 2002.

System input/output block 2112 provides interfaces to sensors which allow users to interact with the device. Interfaces which may be present include interfaces for: a graphical display, a keypad, a keyboard, navigation and function keys including softkeys, a touch screen, one or more thumbwheels, accelerometer(s), and a camera.

Processor 2102 may be one or a combination of several types of electronic processing devices including, but not limited to, a central processing unit, a microprocessor, and a microcontroller.

PMCD 100 may include a digital signal processor (DSP) as a component of, or in addition to, processor 2102. The specialized computational power available in a DSP can allow PMCD 100 to efficiently utilize a multitude of different sensors including those whose outputs can be sampled and digitized, whose outputs are natively digital, or those whose output may require specialized signal processing (e.g., an embedded camera).

Memory subsystem 2104 is illustrated as part of PMCD 100 in FIG. 21A. FIG. 21B illustrates memory 2104 which comprises executable instructions for an operating system 2130, executable instructions for Bluetaps 2132, and executable instructions for other applications 2134.

Figure 22A:
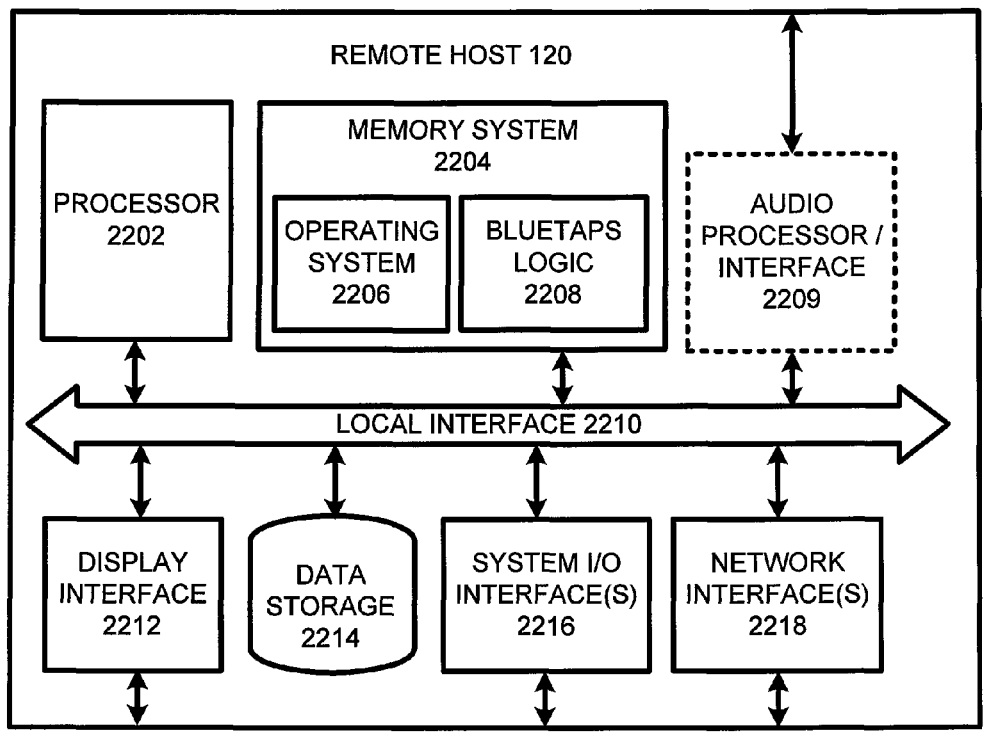
FIG. 22A is a remote host, in one embodiment of the systems and methods disclosed herein.

FIG. 22 illustrates an internal block diagram of a representative architecture for remote host 120 which comprises several blocks including processor 2202, memory sub-system 2204 comprised of volatile memory 2206 and nonvolatile memory 2208, optional Audio Processor and Interface 2209, Local Interface 2210, display interface 2212, data storage 2214, system input/output interface block 2216, and network interface(s) 2218.

System input/output block 2216 provides interfaces to sensors which allow users to interact with the device.

Processor 2202 may be one or a combination of several types of electronic processing devices including, but not limited to, a central processing unit, a microprocessor, and a microcontroller.

Optional audio processor/interface 2209 may contain logic or processors dedicated to synthesizing or generating and playing audio.

Figure 22B:
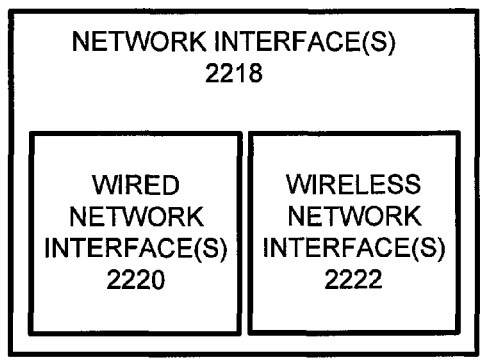
FIG. 22B is a network interface block which includes interfaces to external networks.

FIG. 22B illustrates network interfaces which may include one or more wireless and one or more wired interfaces. One embodiment of the present disclosure may consist only of a single wireless network interface, while additional embodiments may comprise both wireless and wired interfaces.

Figure 23:
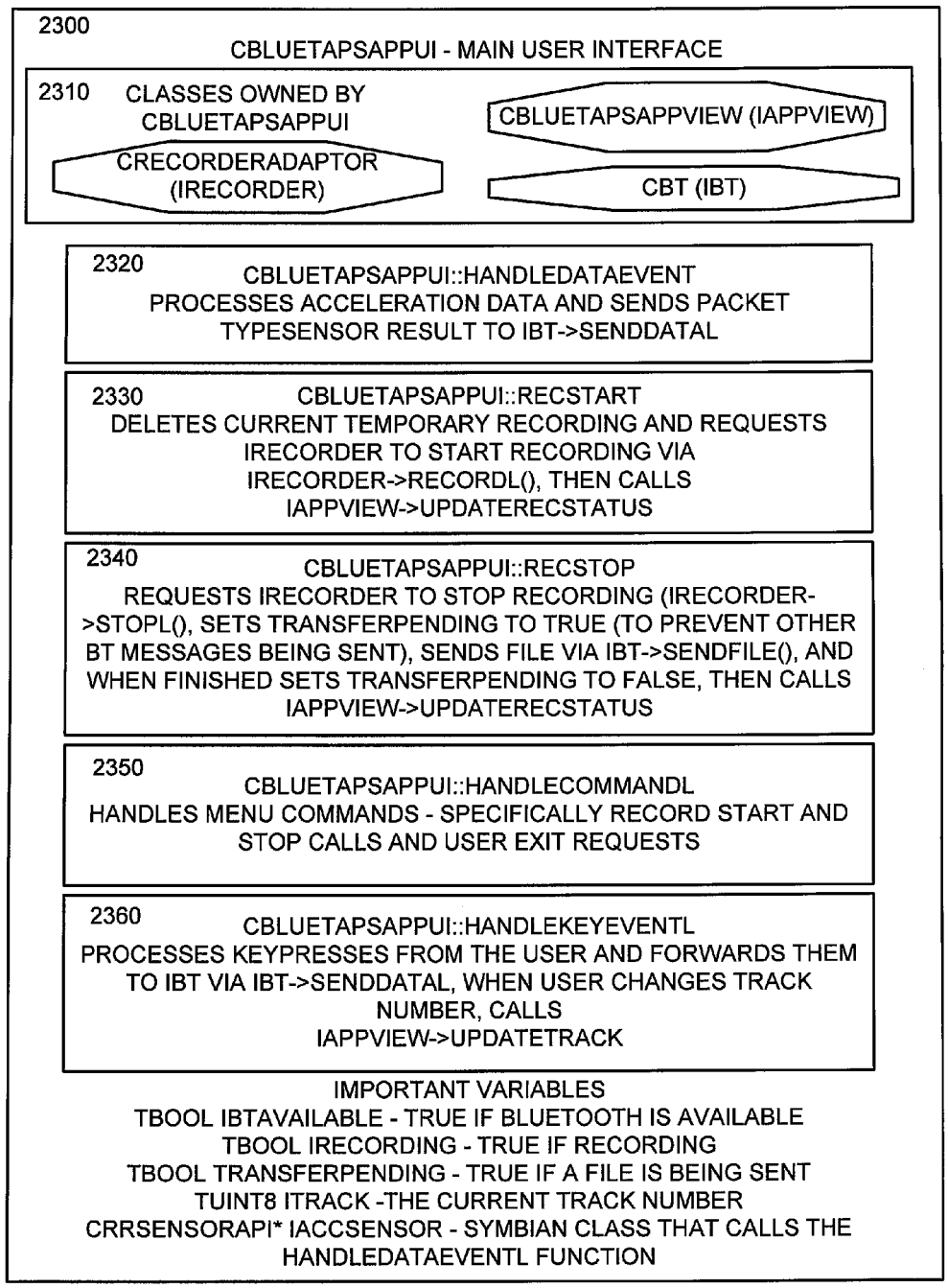
FIG. 23 is a block diagram of the member functions and attributes of an object oriented class for implementing BlueTaps.

FIG. 23 is one embodiment of a class CBlueTapsAPPUI 2300 which implements the main user interface described above. CBlueTapsAPPUI 2300 contains instantiations of classes CRecorderAdapter, CBlueTapsAppView, CBT. Attributes of the class include iBTAvalilable, iRecording, TransferPending, iTrack, and iAccSensor. Methods include HandleDataEvent, RecStart, RecStop, HandleCommandL, and HandleKeyEventL.

Figure 24:
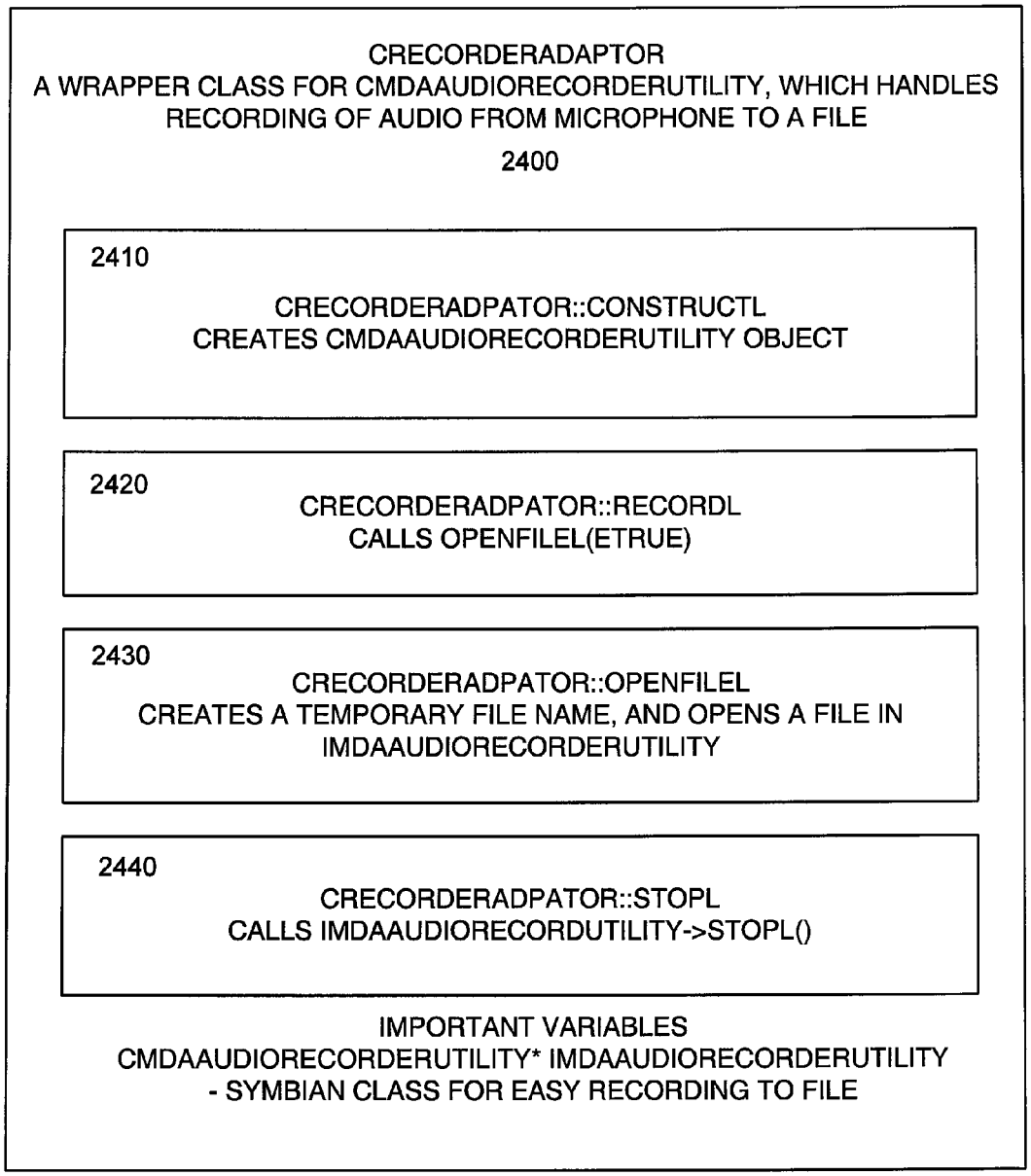
FIG. 24 is a block diagram of the member functions and attributes of an object oriented class for implementing BlueTaps.

FIG. 24 is one embodiment of class CRecorderAdapter 2400 which controls recording from a microphone to a file. Class CRecorderAdapter contains the attribute ImdaAudioRecorderUtility. Methods implemented by the class include ConstructL, RecordL, OpenFileL, and StopL.

Figure 25:
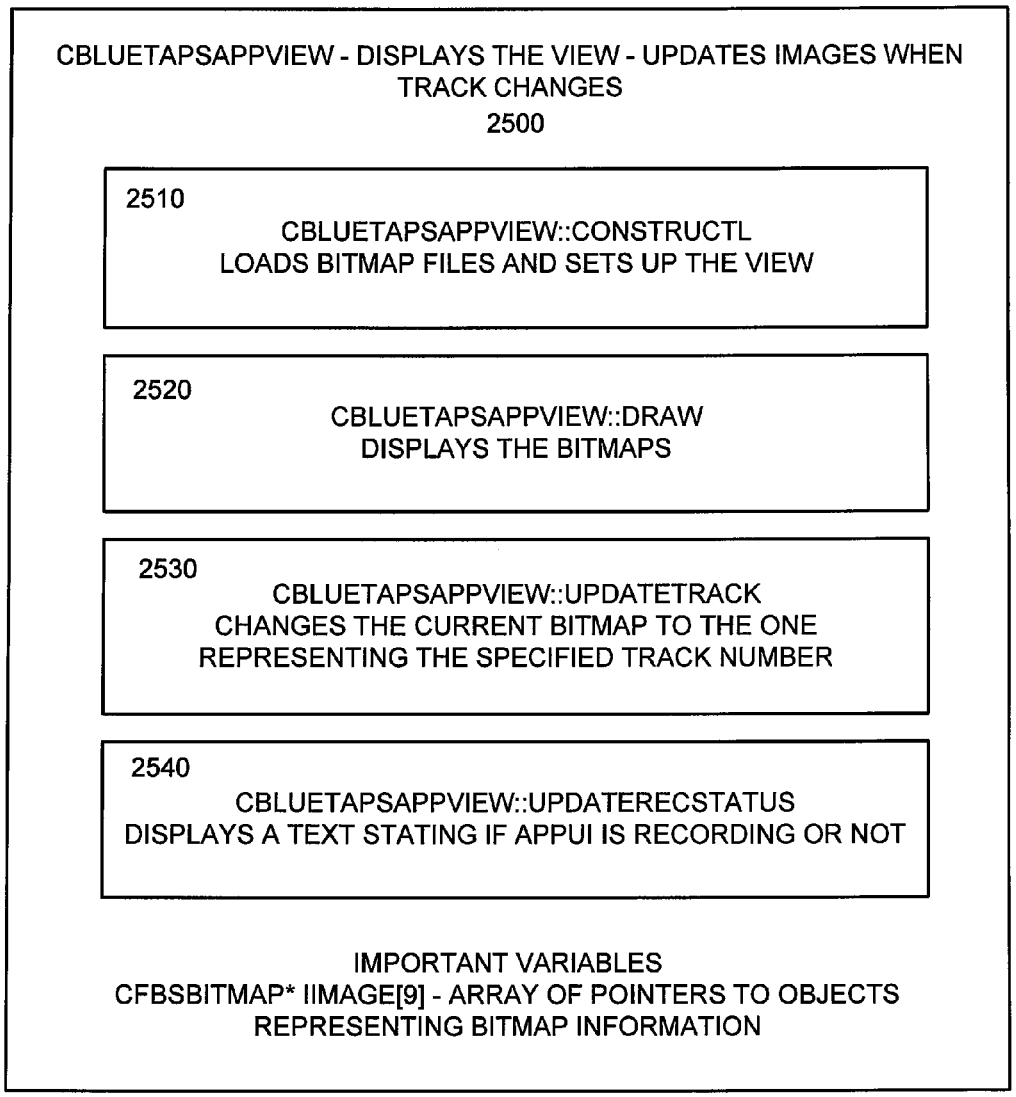
FIG. 25 is a block diagram of the member functions and attributes of an object oriented class for implementing BlueTaps.

FIG. 25 is one embodiment of class CBlueAppsView which display the view and updates the displayed images when the track changes. Attributes of the class include an array Image[] of type CFBitmap. Methods implemented by the class include ConstructL, Draw, UpdateTrack, and UpdateRecStatus.

FIG. 26 is one embodiment of class CBT which instantiates a Symbian™ active object for sending data through a Bluetooth connection. Attributes of the class include iState, iStatus, iAcceptedSocket, and iActiveSocket. Methods implemented by the class include StartL, RunL, SendMessageL, SendDataL, SetSecurityWithChannelL, and SendfileL.

FIG. 27 is one embodiment of class CBTServiceAdvertiser which creates a service record for the Bluetooth RFCOMM protocol and advertises it. The class contains attributes iRecord and ISDPDataBase. Methods implemented by the class include StartAdvertisingL, BuildProtocolDescriptionL, and UpdateAvailability.

Embodiments of the processes 300, 500, 700, 800, 850, 1000, 1100, 1200 and of components 100, 120, 220, 1310-1390, 1400, 1500, 1600, 1700, 1800 and 2300-2700 can be implemented in hardware, software, firmware, or a combination thereof. In one embodiment, these methods can each be implemented in hardware, implemented with any or a combination of the following technologies, which are all well known in the art: a discrete logic circuit(s) having logic gates for implementing logic functions upon signals, a programmable gate array(s)(PGA), a field programmable gate array (FPGA), an applications specific integrated circuit (ASIC) having appropriate combination logic gates, a method on chip (SoC), a method in package (SiP), etc.

If one or more of the functionalities of the methods disclosed herein is implemented as software, as in one embodiment, such functionalities of the method can be software or firmware that is stored in a memory and that is executed by a suitable processor. The method software, which comprises an ordered listing of executable instructions for implementing logical functions, can be embodied in any computer-readable medium for use by or in connection with a processor or processor-containing method. In the context of this document, a "computer-readable medium" can be any means that can contain or store the program for use by or in connection with the processor method, apparatus, or device. The computer readable medium can be, for example but not limited to, an electronic, magnetic, optical, electromagnetic, infrared, or semiconductor medium. More specific examples (a non-exhaustive list) of the computer-readable medium would include the following: a magnetic computer disk or diskette, a random access memory (RAM), a read-only memory (ROM), an erasable programmable read-only memory (EPROM or Flash memory), an optical compact disc read-only memory (CDROM).

It should be emphasized that the above-described embodiments are merely possible examples of implementations, merely set forth for a clear understanding of the disclosed principles. Many variations and modifications may be made to the above-described embodiment(s) without departing substantially from the disclosed spirit and principles. All such modifications and variations are intended to be included herein within the scope of this disclosure and protected by the following claims.

What is claimed is:

1. A system for creating, transforming and playing music, comprising:
   a personal mobile communication device configured to detect a user gesture and generate music composition data; and
   a remote host in communication with the personal mobile communication device, the remote host configured to receive music composition data from the personal mobile communication device and generate music based on the music composition data, wherein the remote host further comprises:
      a second memory for storing a second set of executable instructions; and
      a second processor configured by the second set of executable instructions to receive the music composition data from the personal mobile communication device, wherein the second set of executable instructions further comprises instructions for presenting a plurality of user interface screens, wherein each of the plurality of screens is assigned one track therein to associate with one sound resource of a plurality of sound resources.

2. A system for creating, transforming and playing music, comprising:
   a personal mobile communication device configured to detect a user gesture and generate music composition data; and
   a remote host in WIRELESS communication with the personal mobile communication device, the remote host configured to receive music composition data from the personal mobile communication device and generate music based on the music composition data,
   wherein the personal mobile communication device further comprises:
      a sensor for detecting the user gesture;
      a first memory for storing a first set of executable instructions; and
      a first processor configured by the first set of executable instructions to detect the user gesture sensed by the sensor, and further configured to generate music composition data based on the detected user gesture, the music composition data comprising compositional, transformational, or control data, and further configured to communicate the music composition data to the remote host,
      wherein the first set of executable instructions further comprises instructions for a user interface configured to:
         indicate a default percussion track for recording;
         receive from the user a plurality of user gestures to establish an initial tempo; and
         communicate the plurality of user gestures to the remote host;
   wherein a second set of executable instructions comprises instructions for:
      responsive to receiving a plurality of taps, recording the plurality of taps sequence to the indicated default percussion track; and
      establishing the initial tempo from the plurality of taps; and
      generating an audible metronome at the initial tempo.

3. The system of claim 2, wherein the user gesture includes a key press, a button press, a cursor movement, or a touch screen touch.

4. The system of claim 2, wherein the sensor for detecting the user gesture further comprises a microphone.

5. The system of claim 2, wherein the sensor for detecting the user gesture further comprises an accelerometer.

6. The system of claim 2, wherein the first processor is further configured by the first set of executable instructions to communicate the music composition data to the remote host.

7. The system of claim 6, wherein the first processor is further configured by the first set of executable instructions to:
   receive a user gesture notification; and
   responsive to receiving the user gesture notification, generate a message for communicating music composition data to the host comprising a track identifier and a message type identifier.

8. The system of claim 7, wherein the message for communicating music composition data to the host further comprises a parameter value.

9. The system of claim 6, wherein the first set of executable instructions further comprises instructions for a user interface configured to:
   indicate a default percussion track for recording; receive from the user a plurality of user gestures to establish an initial tempo; and
   communicate the plurality of user gestures to the remote host.

10. A system for creating, transforming and playing music, comprising:
   a personal mobile communication device configured to detect a user gesture and generate music composition data; and
   a remote host in WIRELESS communication with the personal mobile communication device, the remote host configured to receive music composition data from the personal mobile communication device and generate music based on the music composition data,
   wherein the personal mobile communication device further comprises:
      a sensor for detecting the user gesture;
      a first memory for storing a first set of executable instructions; and
      a first processor configured by the first set of executable instructions to detect the user gesture sensed by the sensor, and further configured to generate music composition data based on the detected user gesture, the music composition data comprising compositional, transformational, or control data, and further configured to communicate the music composition data to the remote host,
      wherein the first set of executable instructions further comprises instructions for a user interface configured to:
         indicate a default percussion track for recording;
         receive from the user a plurality of user gestures to establish an initial tempo; and
         communicate the plurality of user gestures to the remote host;

wherein receiving user input from the personal mobile communication device comprises:
- receiving a keydown event;
- receiving a keyup event;
- responsive to receiving the keyup event, calculating a keypress duration based on the keydown event and the keyup event; and
- generating a message comprising a track number, a note number, and a message type corresponding to the event.

11. The system of claim 10, wherein the remote host further comprises:
- a second memory for storing a second set of executable instructions; and
- a second processor configured by the second set of executable instructions to receive the music composition data from the personal mobile communication device.

12. The system of claim 11, wherein the second processor is further configured by the second set of executable instructions to process the music composition data to identify recordable data therein and to record the recordable data to a plurality of tracks, and further configured to synthesize and to play audio from the data recorded to the plurality of tracks.

13. The system of claim 12, wherein the music composition data further comprises recorded audio.

14. The system of claim 13, wherein the recorded audio further comprises:
- audio recorded with a microphone connected to the personal mobile communication device;
- audio received from another personal mobile communication device; or audio of phone calls received by the personal mobile communication device.

15. The system of claim 12, wherein the audio is transformed responsive to the music composition data received by the remote host.

16. The system of claim 12, wherein the second set of executable instructions further comprises instructions for receiving music composition data messages communicated by a plurality of personal mobile communication devices.

17. A method for generating audio, the method comprising the steps of:
- recording music event data in an array, wherein the event data is comprised of a time and a track number;
- responsive to receiving a melodic note event or a hit: storing pitch and velocity for each event;
- quantizing each note or hit; and storing the quantized note at a corresponding index in the array;
- responsive to receiving a control event: storing control data for each control event;
- responsive to receiving a message to increment a current location pointer, incrementing the current location pointer to the next location in the array; and
- sending the contents of the array pointed to by the current location pointer to an output stream buffer;
- retrieving from the output stream buffer a current buffer content pointed to by a current output stream buffer pointer;
- providing the contents of the location pointed to by the current buffer pointer to an audio synthesizer to generate audio; and
- updating the current output stream buffer pointer to point to the next output buffer location.

* * * * *